United States Patent
Chenna Madhavuni

(10) Patent No.: US 12,482,193 B2
(45) Date of Patent: Nov. 25, 2025

(54) INDEPENDENT SCENE MOVEMENT BASED ON MASK LAYERS

(71) Applicant: QUALCOMM Incorporated, San Diego, CA (US)

(72) Inventor: Rakesh Raju Chenna Madhavuni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 18/063,037

(22) Filed: Dec. 7, 2022

(65) Prior Publication Data
US 2024/0193873 A1    Jun. 13, 2024

(51) Int. Cl.
| | | |
|---|---|---|
| G06T 7/20 | (2017.01) | |
| G06T 3/18 | (2024.01) | |
| G06T 7/50 | (2017.01) | |
| G06T 7/73 | (2017.01) | |
| G06T 19/00 | (2011.01) | |
| G06V 40/20 | (2022.01) | |
| H04N 7/18 | (2006.01) | |

(52) U.S. Cl.
CPC .............. *G06T 19/006* (2013.01); *G06T 3/18* (2024.01); *G06T 7/20* (2013.01); *G06T 7/50* (2017.01); *G06T 7/73* (2017.01); *G06V 40/28* (2022.01); *H04N 7/183* (2013.01); *G06T 2207/30196* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 10,824,244 B2* | 11/2020 | Kin | ................. | G06F 3/0304 |
| 2017/0243324 A1* | 8/2017 | Mierle | ................. | G06T 15/005 |
| 2018/0189556 A1* | 7/2018 | Shamir | ................. | G06T 7/269 |
| 2020/0027194 A1* | 1/2020 | Nourai | ................. | G06F 3/011 |
| 2022/0383027 A1* | 12/2022 | Polavarapu | ............ | G06F 18/22 |

FOREIGN PATENT DOCUMENTS

WO    2021226535    11/2021

OTHER PUBLICATIONS

International Search Report and Written Opinion—PCT/US2023/079894—ISA/EPO—Mar. 22, 2024.
Liang H., et al., "AR in Hand: Egocentric Palm Pose Tracking and Gesture Recognition for Augmented Reality Applications", Multimedia, ACM, 2 Penn Plaza, Suite 701 New York NY 10121-0701 USA, Oct. 13, 2015, pp. 743-744, XP058509610, the whole document.
Pasman W., et al., "Augmented Reality with Large 3D Models on a PDA—Implementation, Performance and Use Experiences", Proc. of ACM Siggraph International Conference on Virtual Reality Continuum and Its Applications in Industry (VRCAI), Jan. 1, 2004, pp. 344-351, XP003028290, the whole document.

* cited by examiner

*Primary Examiner* — Joni Hsu
(74) *Attorney, Agent, or Firm* — Polsinelli

(57) ABSTRACT

Techniques and systems are provided for image generation. For instance, a process can include rendering an image of a scene, the scene including a first virtual object associated with a first physical object that moves independently of the scene, identifying a first set of pixels associated with the first virtual object in the image of the scene, generating a mask layer based on the first set of pixels, the mask layer indicating locations of the first set of pixels in the image, and transmitting the mask layer and the image to a display.

29 Claims, 13 Drawing Sheets

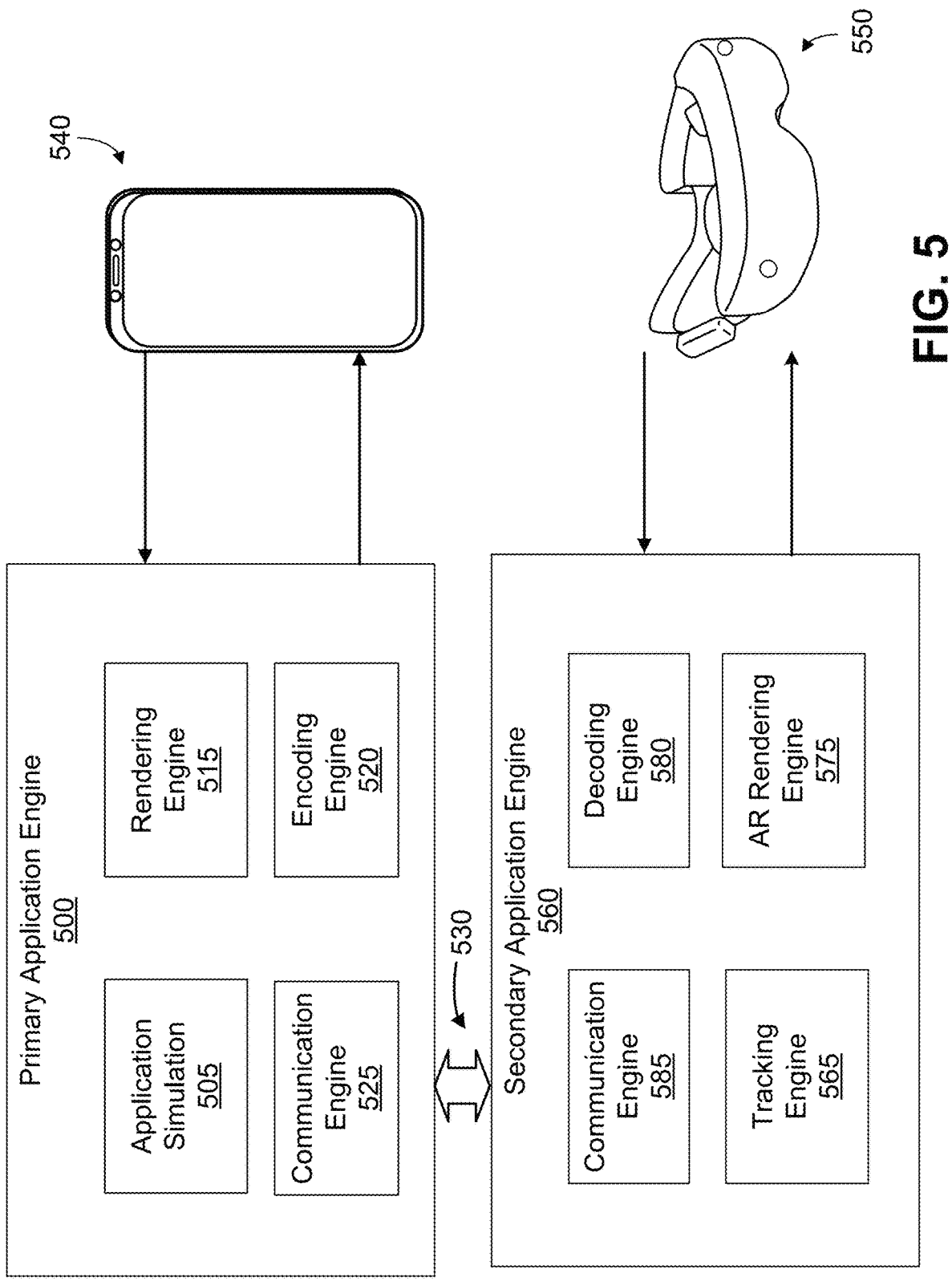

700

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 1 | 1 | 1 | 0 | 0 |
| 0 | 0 | 0 | 0 | 0 | 1 | 1 | 1 | 0 | 0 |
| 0 | 0 | 0 | 0 | 0 | 1 | 1 | 1 | 0 | 0 |
| 0 | 0 | 0 | 0 | 0 | 1 | 1 | 1 | 0 | 0 |
| 0 | 0 | 0 | 0 | 0 | 0 | 0 | 0 | 0 |
| 0 | 0 | 0 | 0 | 0 | 0 | 0 | 0 | 0 |

FIG. 7

INDEPENDENT SCENE MOVEMENT BASED ON MASK LAYERS

FIELD

This application is related to processing one or more images for extended reality systems. For example, aspects of the application relate to systems and techniques for determining independent scene movement based on one or more mask layers.

BACKGROUND

Degrees of freedom (DoF) refer to the number of basic ways a rigid object can move through three-dimensional (3D) space. In some examples, six different DoF can be tracked. The six DoF include three translational DoF corresponding to translational movement along three perpendicular axes, which can be referred to as x, y, and z axes. The six DoF include three rotational DoF corresponding to rotational movement around the three axes, which can be referred to as pitch, yaw, and roll. Some extended reality (XR) devices, such as virtual reality (VR) or augmented reality (AR) headsets, can track some or all of these degrees of freedom. For instance, a 3DoF XR headset typically tracks the three rotational DoF, and can therefore track whether a user turns and/or tilts their head. A 6DoF XR headset tracks all six DoF, and thus also tracks a user's translational movements.

XR systems typically use powerful processors to perform feature analysis (e.g., extraction, tracking, etc.) and other complex functions quickly enough to display an output based on those functions to their users. Powerful processors generally draw power at a high rate. Similarly, sending large quantities of data to a powerful processor typically draws power at a high rate. Headsets and other portable devices typically have small batteries so as not to be uncomfortably heavy to users. Thus, some XR systems must be plugged into an external power source, and are thus not portable. Portable XR systems generally have short battery lives and/or are uncomfortably heavy due to inclusion of large batteries.

SUMMARY

Systems and techniques are described herein for displaying augmented reality enhanced media content. For example, aspects of the present disclosure relate to systems and techniques for reducing power and bandwidth for XR systems while maintaining image quality using low latency and lower power independent scene movement. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for an apparatus for image generation is provided. The apparatus includes a memory comprising instructions; and a processor coupled to the memory. The processor is configured to: render an image of a scene, the scene including a first virtual object associated with a first physical object that moves independently of the scene; identify a first set of pixels associated with the first virtual object in the image of the scene; generate a mask layer based on the first set of pixels, the mask layer indicating locations of the first set of pixels in the image; and transmit the mask layer and the image to a display.

As another example, an apparatus for image generation is provided. The apparatus includes a memory comprising instructions; and a processor coupled to the memory. The at least one processor is configured to: obtain a mask layer and an image associated with the mask layer, wherein the mask layer is associated with a first virtual object; generate updated pose information for the apparatus, wherein the updated pose information indicates movement between a time when the image was generated and a current time; obtain updated pose information for a first physical object, wherein the first physical object moves independently of the apparatus, and wherein the first physical object is associated with the first virtual object; determine a first amount to warp the image based on the updated pose information for the apparatus; determine a second amount to warp a first portion of the image based on the mask layer and the updated pose information for the first physical object; warp the image, based on the first amount to warp the image based on the updated pose information, and the first portion of the image, based on the second amount to warp a first virtual object with the first physical object; and display a final warped image based on the warping of the image and the warping of the first portion of the image.

In another example, a method for image generation is provided. The method includes rendering an image of a scene, the scene including a first virtual object associated with a first physical object that moves independently of the scene; identifying a first set of pixels associated with the first virtual object in the image of the scene; generating a mask layer based on the first set of pixels, the mask layer indicating locations of the first set of pixels in the image; and transmitting the mask layer and the image to a display.

For another example, a method for image generation is provided. The method includes obtaining a mask layer and an image associated with the mask layer, wherein the mask layer is associated with a first virtual object; generating updated pose information for an apparatus, wherein the updated pose information indicates movement between a time when the image was generated and a current time; obtaining updated pose information for a first physical object, wherein the first physical object moves independently of the apparatus, and wherein the first physical object is associated with the first virtual object; determining a first amount to warp the image based on the updated pose information for the apparatus; determining a second amount to warp a first portion of the image based on the mask layer and the updated pose information for the first physical object; warping the image, based on the first amount to warp the image based on the updated pose information, and the first portion of the image, based on the second amount to warp a first virtual object with the first physical object; and displaying a final warped image based on the warping of the image and the warping of the first portion of the image.

As another example, a non-transitory computer-readable medium is provided that has stored thereon instructions that, when executed by at least one processor, cause the at least one processor to: render an image of a scene, the scene including a first virtual object associated with a first physical object that moves independently of the scene; identify a first set of pixels associated with the first virtual object in the image of the scene; generate a mask layer based on the first set of pixels, the mask layer indicating locations of the first set of pixels in the image; and transmit the mask layer and the image to a display.

As another example, a non-transitory computer-readable medium is provided that has stored thereon instructions that, when executed by at least one processor, cause the at least one processor to: obtain a mask layer and an image associated with the mask layer, wherein the mask layer is associated with a first virtual object; generate updated pose information for an apparatus, wherein the updated pose information indicates movement between a time when the image was generated and a current time; obtain updated pose information for a first physical object, wherein the first physical object moves independently of the apparatus, and wherein the first physical object is associated with the first virtual object; determine a first amount to warp the image based on the updated pose information for the apparatus; determine a second amount to warp a first portion of the image based on the mask layer and the updated pose information for the first physical object; warp the image, based on the first amount to warp the image based on the updated pose information, and the first portion of the image, based on the second amount to warp a first virtual object with the first physical object; and display a final warped image based on the warping of the image and the warping of the first portion of the image.

In another example, an apparatus for image generation. The apparatus includes means for rendering an image of a scene, the scene including a first virtual object associated with a first physical object that moves independently of the scene; means for identifying a first set of pixels associated with the first virtual object in the image of the scene; means for generating a mask layer based on the first set of pixels, the mask layer indicating locations of the first set of pixels in the image; and means for transmitting the mask layer and the image to a display.

In another example, an apparatus for image generation. The apparatus includes means for obtaining a mask layer and an image associated with the mask layer, wherein the mask layer is associated with a first virtual object; means for generating updated pose information for an apparatus, wherein the updated pose information indicates movement between a time when the image was generated and a current time; means for obtaining updated pose information for a first physical object, wherein the first physical object moves independently of the apparatus, and wherein the first physical object is associated with the first virtual object; means for determining a first amount to warp the image based on the updated pose information for the apparatus; means for determining a second amount to warp a first portion of the image based on the mask layer and the updated pose information for the first physical object; means for warping the image, based on the first amount to warp the image based on the updated pose information, and the first portion of the image, based on the second amount to warp a first virtual object with the first physical object; and means for displaying a final warped image based on the warping of the image and the warping of the first portion of the image.

In some aspects, the apparatus can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 5 illustrates an example of a primary application engine and a secondary application engine that can provide an augmented reality enhancement to the primary application engine, in accordance with aspects of the present disclosure.

FIG. 7 illustrates an example mask layer, in accordance with aspects of the present disclosure.

DETAILED DESCRIPTION

Figure 1:
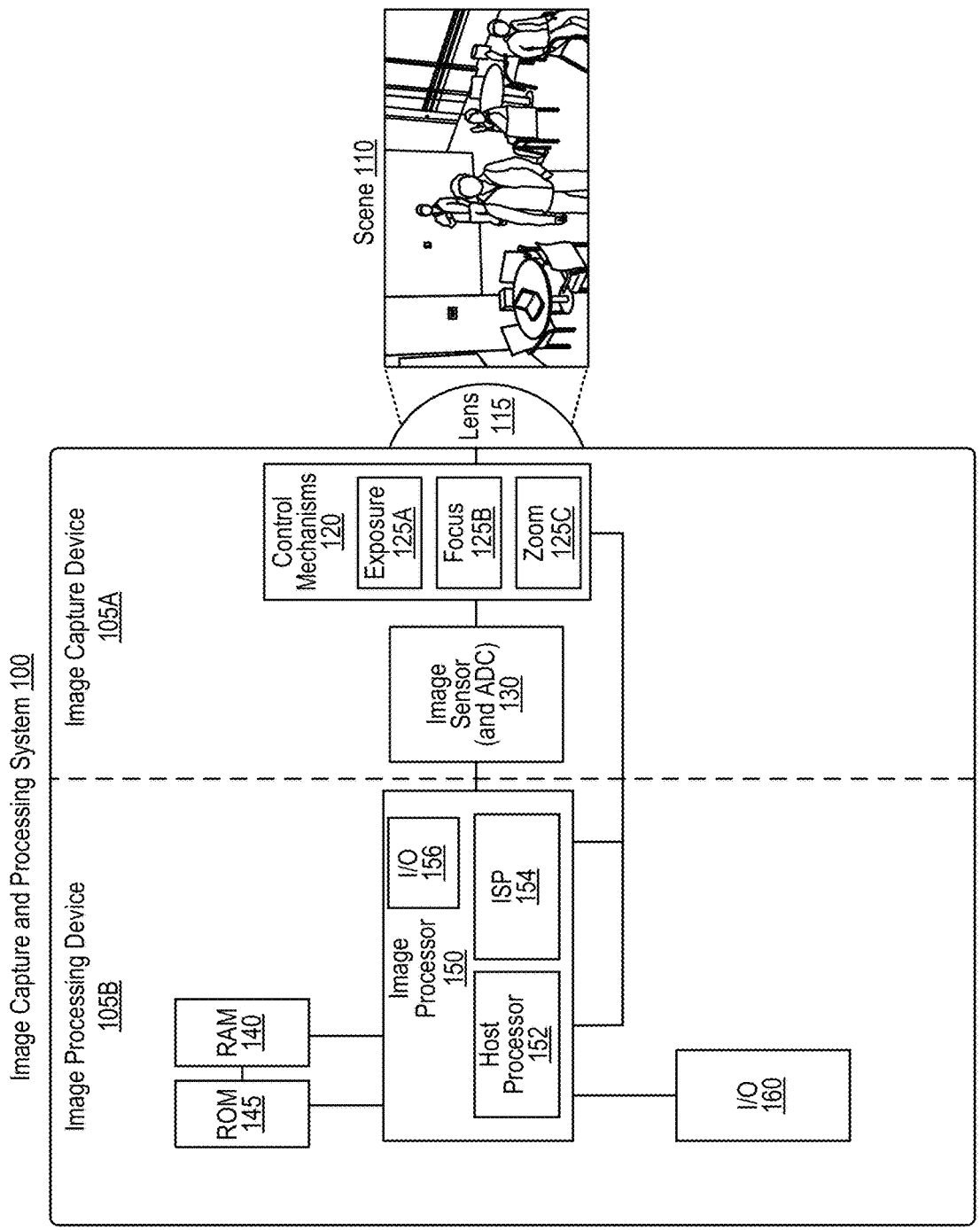
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

A camera (e.g., image capture device) is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Degrees of freedom (DoF) refer to the number of basic ways a rigid object can move through three-dimensional (3D) space. In some cases, six different DoF can be tracked. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In the context of systems that track movement through an environment, such as XR systems and/or VSLAM systems, degrees of freedom can refer to which of the six degrees of freedom the system is capable of tracking. 3DoF systems generally track the three rotational DoF—pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

In some cases, an XR system may include an HMD display, such as AR HMD or AR glasses, that may be worn by a user of the XR system. Generally, it is desirable to keep an HMD display as light and small as possible. To help reduce the weight and the size of an HMD display, the HMD display may be a relatively lower power system (e.g., in terms of battery and computational power) as compared to a device (e.g., a companion device, such as a mobile phone, a server device, or other device) with which the HMD display is connected (e.g., wired or wireless connected).

In some cases, split rendering may be implemented. In split rendering, the companion device may perform certain tasks with respect to one or more images to be displayed by the HMD display and transmit results of the tasks to the HMD display. The HMD display may then perform additional image processing tasks and display the one or more images. In some cases, there may be a delay inherent in remotely performing certain tasks at the companion device and transmitting the results to the HMD display for additional processing. In an XR system, it is possible for a user of the XR system to move the HMD display during such a delay. This movement can induce an overall shift in a field of view of the HMD display. Additionally, one or more objects in a field of view of the HMD display may move independently of the motion of the HMD display, such as a user's hand, arms, or other objects. Using a same transformation for different movements (e.g., hand movements, arm movements, etc.) can result in objects being displayed at incorrect positions on the display, which can result in an inconsistent immersive XR experience for the user of the HMD display. In addition, Systems, apparatuses, methods (also referred to as processes), and computer-readable media (collectively referred to herein as "systems and techniques") are described herein for determining independent scene movement based on one or more mask layers. For instance, the systems and techniques can adjust (e.g., warp) portions of a rendered image to account for movement of an XR device (e.g., an HMD display, AR glasses, etc.) as well as objects that may move independently of the XR device. In one illustrative example, a companion device can determine a virtual object is associated with a physical object (e.g., a user's hand) in the field of view of the XR device that may move independently of the XR device. The companion device can generate a mask layer indicating pixels associated with this the object. The companion device can transmit the mask layer to the XR device along with images to be displayed by the XR device. The XR device can warp (e.g., adjust) the images based on the mask layer to account for movement of the XR device and movement of the physical object. The XR device can then display the warped images. In addition to split rendering cases, the techniques discussed herein may be applicable to other contexts where there may be a delay between render time and display of the rendered images, such as for server-based rendering.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 10:
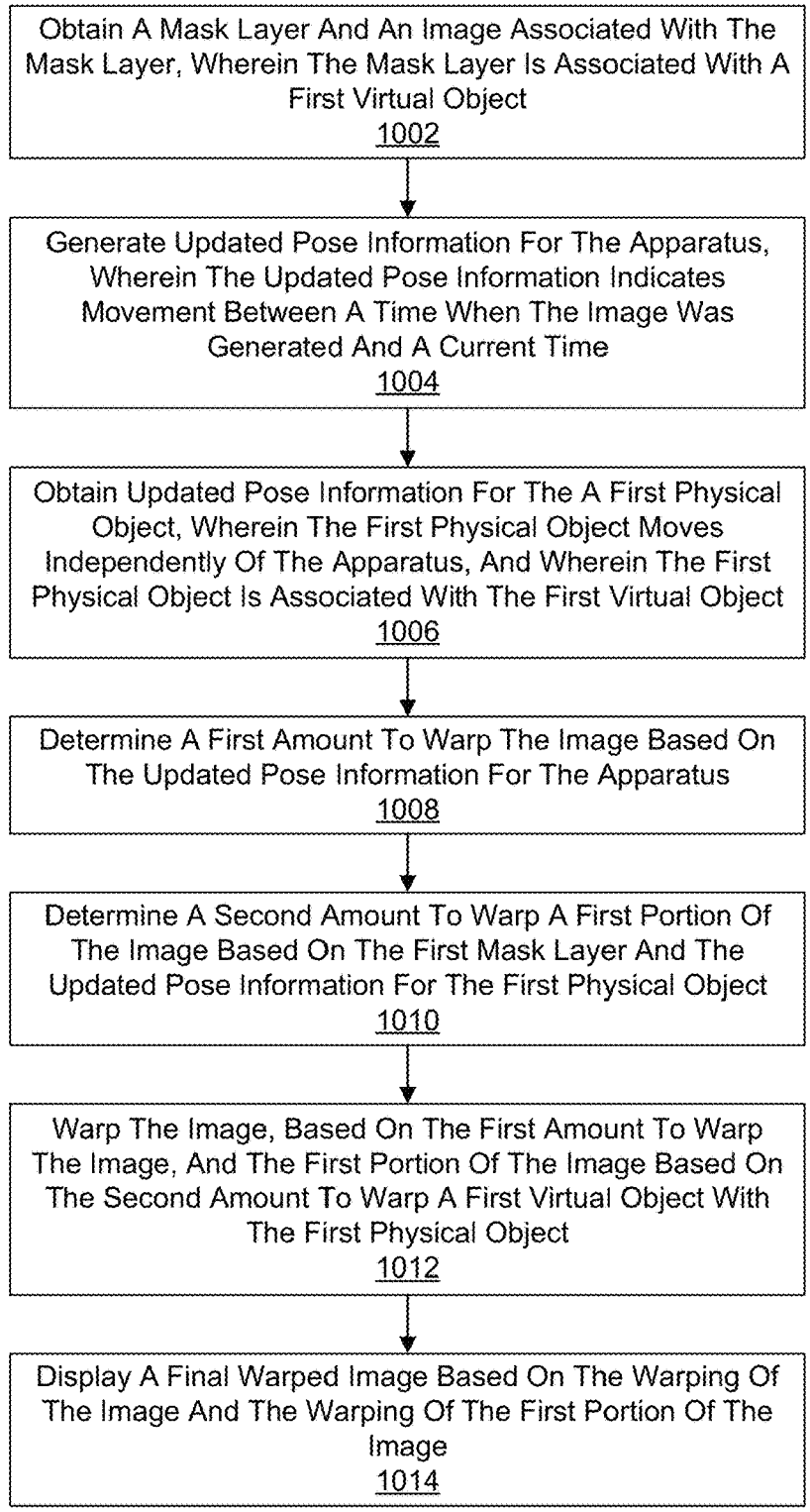
FIG. 10 is a flow diagram illustrating another example of a process for performing image generation, in accordance with some aspects.

The image processor 150 may include one or more processors, such as one or more image signal processors (ISPs) (including ISP 154), one or more host processors (including host processor 152), and/or one or more of any other type of processor 1010 discussed with respect to the computing system 1000 of FIG. 10. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
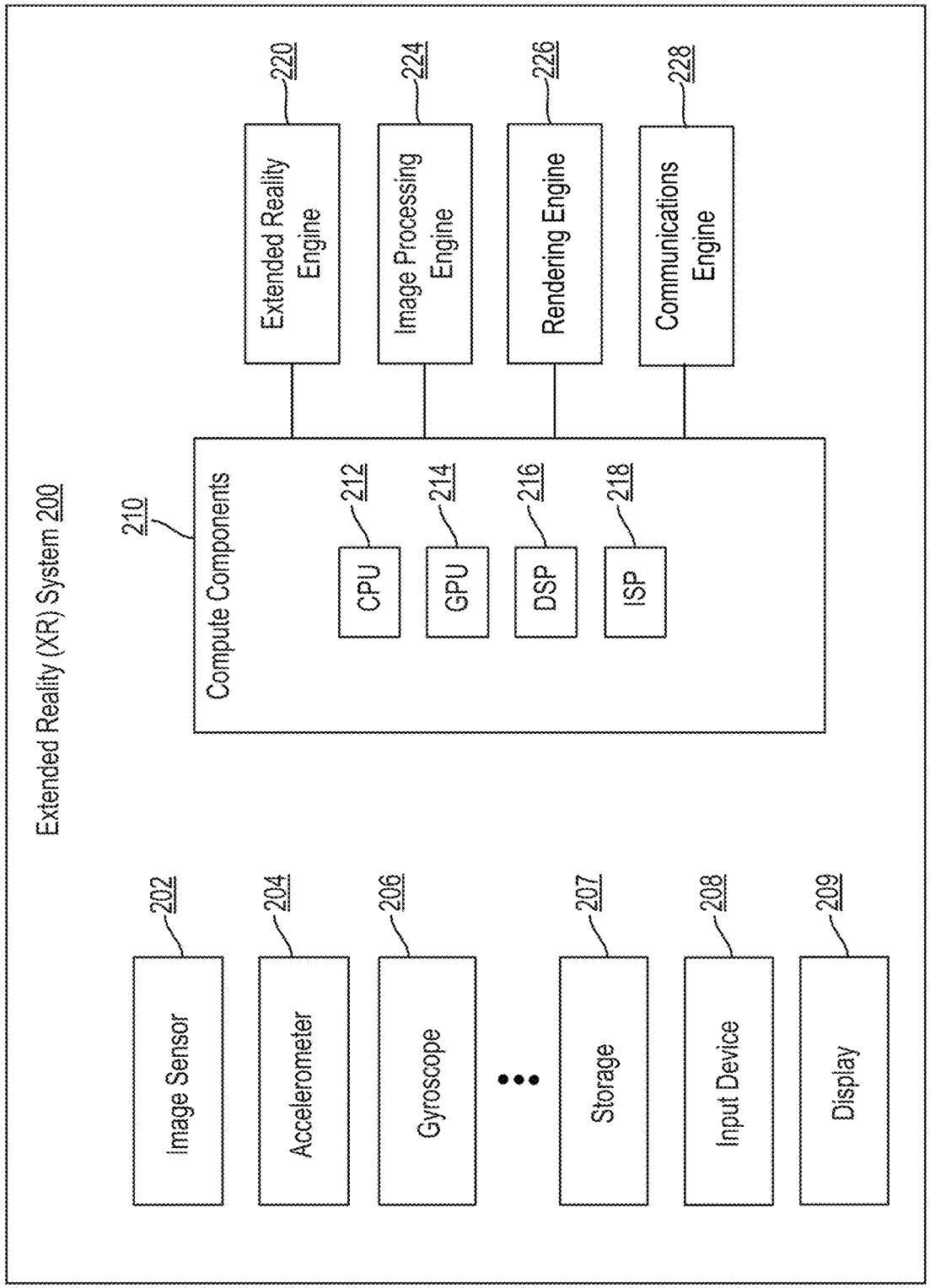
FIG. 2 is a diagram illustrating an architecture of an example extended reality (XR) system, in accordance with some aspects of the disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1045 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1040 of FIG. 10.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 210 can extract feature points corresponding to a mobile device (e.g., mobile device 440 of FIG. 4, mobile device 540 of FIG. 5), or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
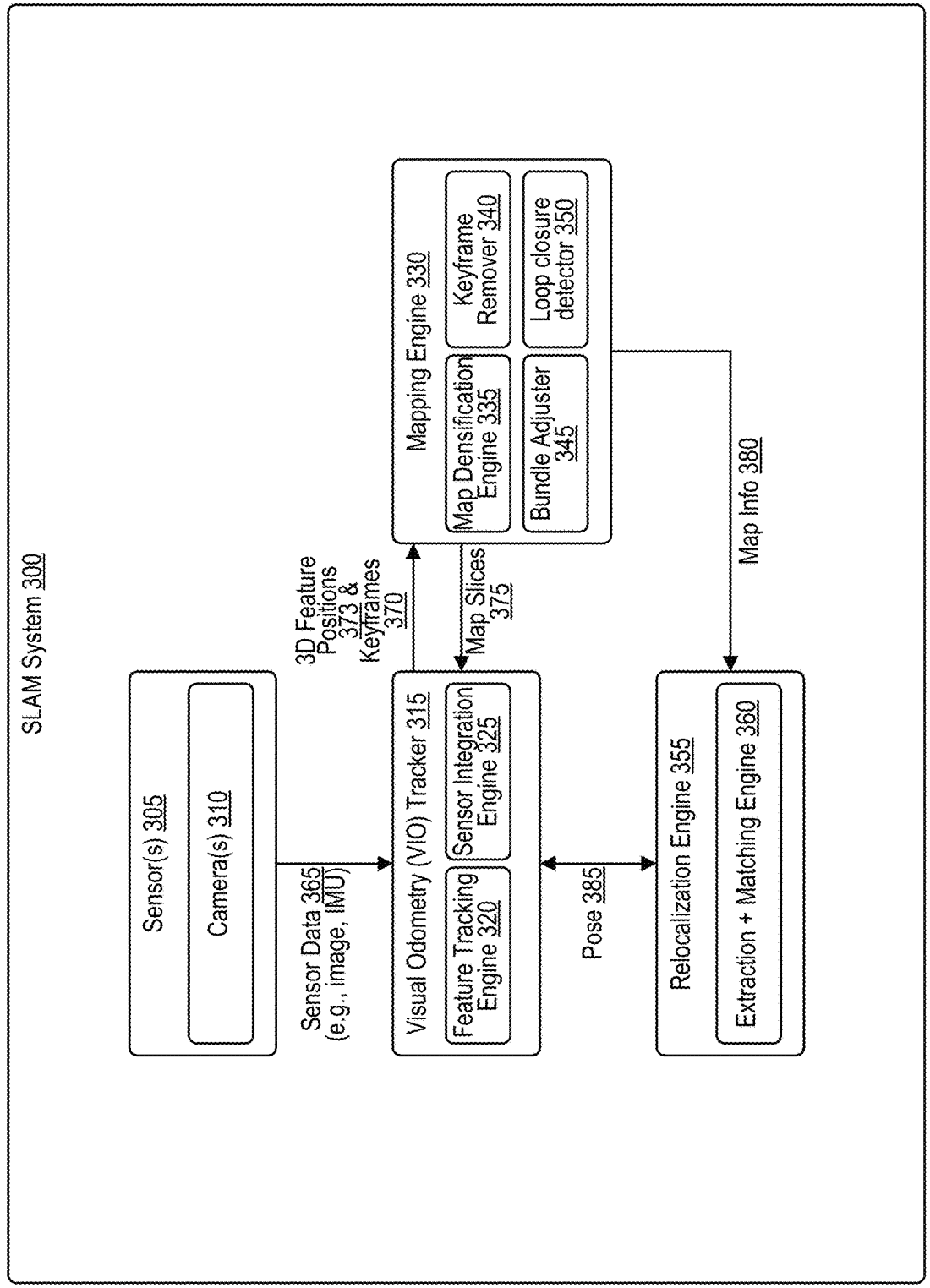
FIG. 3 is a block diagram illustrating an architecture of a simultaneous localization and mapping (SLAM) system, in accordance with aspects of the present disclosure.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 373 of a particular feature. The 3D feature positions 373 can include one or more 3D feature positions and can also be referred to as 3D feature points. The 3D feature positions 373 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. A keyframe (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 373 of the particular feature when considered by the feature tracking engine 320 and/or the sensor integration engine 325 for determination of the 3D feature positions 373. In some examples, a keyframe corresponding to a particular feature also includes data associated with the pose 385 of the SLAM system 300 and/or the camera(s) 310 during capture of the keyframe. In some examples, the VIO tracker 315 can send 3D feature positions 373 and/or keyframes 370 corresponding to one or more features to the mapping engine 330. In some examples, the VIO tracker 315 can receive map slices 375 from the mapping engine 330. The VIO tracker 315 can feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 373 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 373. The map information 380 can include one or more keyframes 370 corresponding to certain features and certain 3D feature positions 373.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can by extract features from an image captured by the cameras 310 of the SLAM system 300 while the SLAM system 300 is at a current pose 385, and can match the extracted features to features depicted in different keyframes 370, identified by 3D feature positions 373, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

Figure 4:
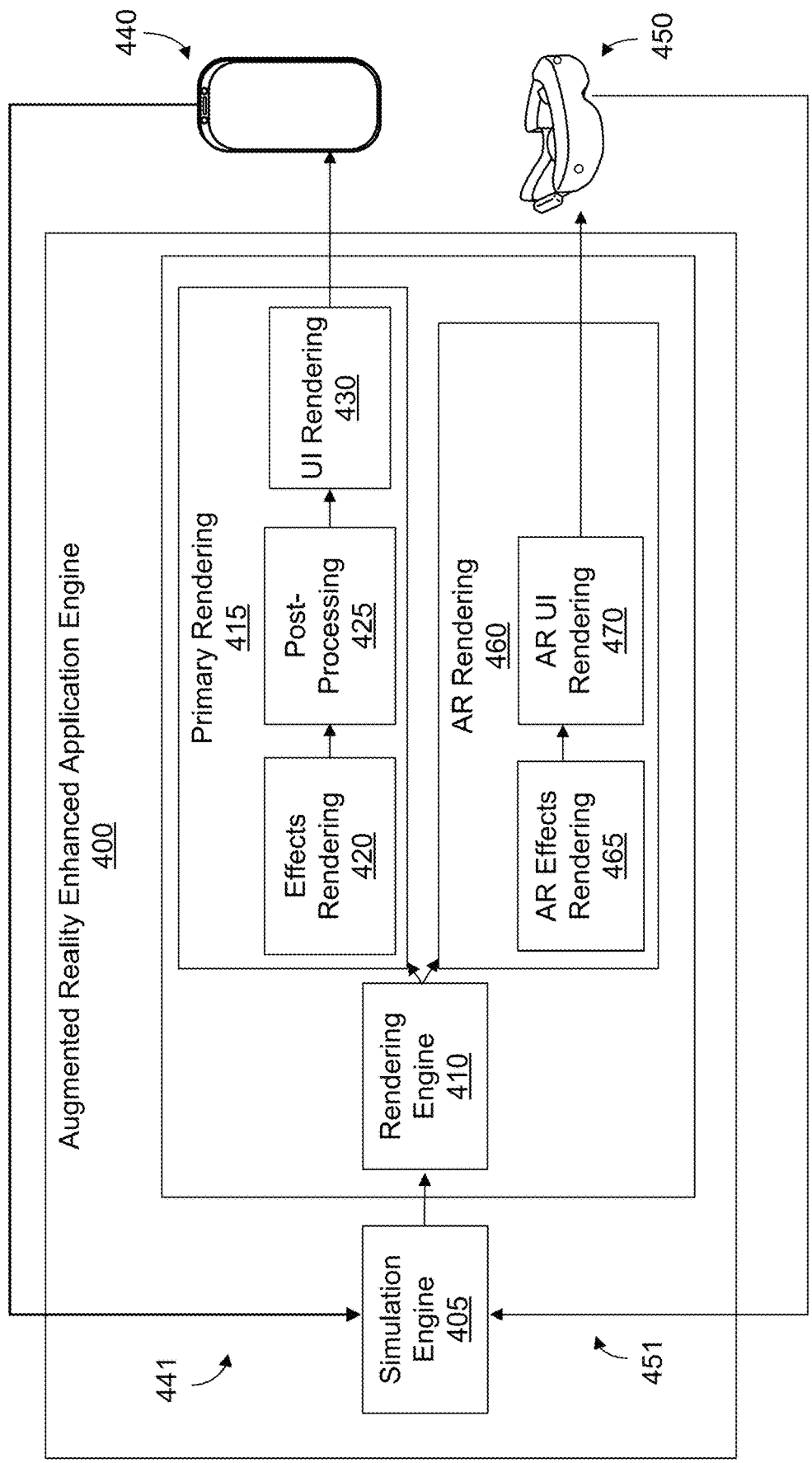
FIG. 4 illustrates an example of an augmented reality enhanced application engine, in accordance with aspects of the present disclosure.

FIG. 4 illustrates an example of an augmented reality enhanced application engine 400. In the illustrative example, the augmented reality enhanced application engine 400 includes a simulation engine 405, a rendering engine 410, a primary rendering module 415, and AR rendering module 460. As illustrated, the primary rendering module 415 can include an effects rendering engine 420, a post-processing engine 425, and a user interface (UI) rendering engine 430. The AR rendering module 460 can include an AR effects rendering engine 465 and an AR UI rendering engine 470. It should be noted that the components 405-470 shown in FIG. 4 are non-limiting examples provided for illustrative and explanation purposes, and other examples can include more, fewer, or different components than those shown in FIG. 4.

In some cases, the augmented reality enhanced application engine 400 is included in and/or is in communication with (wired or wirelessly) an electronic device 440. In some examples, the augmented reality enhanced application engine 400 is included in and/or is in communication with (wired or wirelessly) an XR system 450.

In the illustrated example of FIG. 4, the simulation engine 405 can generate a simulation for the augmented reality enhanced application engine 400. In some cases, the simulation can include, for example, one or more images, one or more videos, one or more strings of characters (e.g., alphanumeric characters, numbers, text, Unicode characters, symbols, and/or icons), one or more two-dimensional (2D) shapes (e.g., circles, ellipses, squares, rectangles, triangles, other polygons, rounded polygons with one or more rounded corners, portions thereof, or combinations thereof), one or more three-dimensional (3D) shapes (e.g., spheres, cylinders, cubes, pyramids, triangular prisms, rectangular prisms, tetrahedrons, other polyhedrons, rounded polyhedrons with one or more rounded edges and/or corners, portions thereof, or combinations thereof), textures for shapes, bump-mapping for shapes, lighting effects, or combinations thereof. In some examples, the simulation can include at least a portion of an environment. The environment may be a real-world environment, a virtual environment, and/or a mixed environment that includes real-world environment elements and virtual environment elements.

In some cases, the simulation generated by the simulation engine 405 can be dynamic. For example, the simulation engine 405 can update the simulation based on different triggers, including, without limitation, physical contact, sounds, gestures, input signals, passage of time, and/or any combination thereof. As used herein, an application state of the augmented reality enhanced application engine 400 can include any information associated with the simulation engine 405, rendering engine 410, primary rendering module 415, effects rendering engine 420, post-processing engine 425, UI rendering engine 430, AR rendering module 460, AR effects rendering engine 465, AR UI rendering engine 470, inputs to the augmented reality enhanced application engine 400, outputs from the augmented reality enhanced application engine 400, and/or any combination thereof at a particular moment in time.

As illustrated, the simulation engine 405 can obtain mobile device input 441 from the mobile device 440. In some cases, the simulation engine 405 can obtain XR system input 451 from the XR system 450. The mobile device input 441 and/or XR system input 451 can include, for example, user input through a user interface of the application displayed on the display of the mobile device 440, user inputs from an input device (e.g., input device 208 of FIG. 2), one or more sensors (e.g., image sensor 202, accelerometer 204, gyroscope 206 of FIG. 2). In some cases, simulation engine 405 can update the application state for the augmented reality enhanced application engine 400 based on the mobile device input 441, XR system input 451, and/or any combination thereof.

In the illustrative example of FIG. 4, the rendering engine 410 can obtain application state information from the simulation engine 405. In some cases, the rendering engine 410 can determine portions of the application state information to be rendered by the displays available to the augmented reality enhanced application engine 400. For example, the rendering engine rendering engine 410 can determine whether a connection (wired or wireless) has been established between the XR system 450 and the mobile device 440. In some cases, the rendering engine 410 can determine the application state information to be rendered by the primary rendering module 415 and the AR rendering module 460. In some cases, the rendering engine 410 can determine that the XR system 450 is not connected (wired or wirelessly) to the mobile device 440. In some cases, the rendering engine 410 can determine the application state information for the primary rendering module 415 and forego determining application state information to be rendered by the AR rendering module 460 that will not be displayed.

Accordingly, the rendering engine 410 can facilitate an adaptive rendering configuration for the augmented reality enhanced application engine 400 based on the availability and/or types of available displays. In some implementations, a separate rendering engine 410 as shown in FIG. 4 may be excluded. In one illustrative example, the primary rendering module 415 and/or AR rendering module 460 can include at least a portion of the functionality of the rendering engine 410 described above.

The primary rendering module 415 can include an effects rendering engine 420, post-processing engine 425, and UI rendering engine 430. In some cases, the primary rendering module 415 can render image frames configured for display on a display of the mobile device 440. As illustrated, the primary rendering module 415 can output the generated image frames (e.g., media content) to be displayed on a display of the mobile device 440. In some cases, the effects rendering information can render application state information generated by the simulation engine 405. For example, the effects rendering engine can generate a 2D projection of a portion of a 3D environment included in the application state information. For example, the rendering engine 420 may generate a perspective projection of the 3D environment by a virtual camera. In some cases, the application state information can include a pose of the virtual camera within the environment. In some cases, the effects rendering engine 420 can generate additional visual effects that are not included within the 3D environment. For example, the rendering engine 420 can apply texture maps to enhance the visual appearance of the effects generated by the 420. In some cases, the rendering engine 420 can exclude portions of the application state information designated for the AR rendering module 460 by the rendering engine 410. For example, the primary rendering module 415 may exclude effects present in the environment of the simulation.

In some cases, post-processing engine post-processing engine 425 can provide additional processing to the rendered effects generated by the effects rendering engine 420. For example, the post-processing engine 425 can perform scaling, image smoothing, z-buffering, contrast enhancement, gamma, color mapping, any other image processing, and/or any combination thereof.

In some implementations, UI rendering engine 430 can render a UI. In some cases, the user interface can provide application state information in addition to the effects rendered based on the application environment (e.g., a 3D environment). In some cases, the UI can be generated as an overlay over a portion of the image frame output by the post-processing engine 425.

The AR rendering module 460 can include an AR effects rendering engine 465 and an AR UI rendering engine 470. In some cases, the AR effects rendering engine 465 can render application state information generated by the simulation engine 405. For example, the AR effects rendering engine 465 can generate a 2D projection of a 3D environment included in the application state information. In some cases, the AR effects rendering engine 465 can generate effects that appear to protrude out from the display surface of the display of the mobile device 440.

In some cases, the display of the XR system 450 can have different display parameters (e.g., a different resolution, frame rate, aspect ratio, and/or any other display parameters) than the display of the mobile device 440. In some cases, the display parameters can also vary between different types of output devices (e.g., different HMD models, other XR systems, or the like). As a result, rendering display data for the 450 with the AR rendering module 460 can affect performance of the primary rendering module 415 (e.g., by consuming computational resources of a GPU, CPU, memory, or the like). In some cases, inclusion of the AR rendering module 460 within the augmented reality enhanced application engine 400 can require periodic updates to provide compatibility with different devices.

FIG. 5 illustrates an example of a primary application engine 500 and a secondary application engine 560 that can provide an augmented reality enhancement to the primary application engine 500. In the illustrative example of FIG. 5, the primary application engine 500 includes a simulation engine 505, a rendering engine 515, an encoding engine 520, and a communication engine 525. In the illustrated example, the secondary application engine 560 includes a tracking engine 565 (e.g., XR engine 220 of FIG. 2, VIO tracker 315 of FIG. 3), an AR rendering engine 575, a decoding engine 580, and a communication engine 585. As illustrated the primary application engine 500 and secondary application engine 560 can communicate over a (wired or wireless) communications link 530. It should be noted that the components 505-525 shown in the primary application engine 500 of FIG. 5 are non-limiting examples provided for illustrative and explanation purposes, and other examples can include more, fewer, or different components than those shown in FIG. 5. Similarly, it should be noted that the components 565-585 shown in the secondary application engine 560 of FIG. 5 are non-limiting examples provided for illustrative and explanation purposes, and other examples can include more, fewer, or different components than those shown in FIG. 5.

In the illustrated example of FIG. 5, the simulation engine 505 of primary application engine 500 can generate a simulation for an application on a mobile device 540. In some cases, the simulation can include, for example, one or more images, one or more videos, one or more strings of characters (e.g., alphanumeric characters, numbers, text, Unicode characters, symbols, and/or icons), one or more two-dimensional (2D) shapes (e.g., circles, ellipses, squares, rectangles, triangles, other polygons, rounded polygons with one or more rounded corners, portions thereof, or combinations thereof), one or more three-dimensional (3D) shapes (e.g., spheres, cylinders, cubes, pyramids, triangular prisms, rectangular prisms, tetrahedrons, other polyhedrons, rounded polyhedrons with one or more rounded edges and/or corners, portions thereof, or combinations thereof), textures for shapes, bump-mapping for shapes, lighting effects, or combinations thereof. In some examples, the simulation can include at least a portion of an environment. The environment may be a real-world environment, a virtual environment, and/or a mixed environment that includes real-world environment elements and virtual environment elements.

In some cases, the simulation generated by the simulation engine 505 can be dynamic. For example, the simulation engine 505 can update the simulation based on different triggers, including, without limitation, physical contact, sounds, gestures, input signals, passage of time, and/or any combination thereof. As used herein, an application state of the primary application engine 500 can include any information associated with the simulation engine 505, effects rendering engine 515, communication engine 525, and/or any combination thereof at a particular moment in time.

The rendering engine 515 can correspond to the primary rendering module 415 of FIG. 5 and perform similar functions. For example, the rendering engine 515 can include modules for effects rendering (e.g., rendering engine 420 of FIG. 4), post-processing (e.g., post-processing engine 425 of FIG. 4), and/or UI rendering (e.g., UI rendering engine 430 of FIG. 4).

The communication engine 525 of the primary application engine 500 and the communication engine 585 of the secondary application engine 560 can communicate over a communications link 530. In some cases, the communications link 530 can be bidirectional. In some examples, the communication engine 525 can transmit application state information (e.g., from the simulation engine 505) to the communication engine 585 of the 560. In some cases, the application state information can include information that can be used to generate AR effects. In some examples, the application state information can include data that can be used by the secondary application engine 560 to generate an AR UI. In some cases, the communication engine 525 can also transmit inputs obtained from the mobile device 540 over the communications link 530 to the communication engine 585. In some cases, the communication engine 585 of the secondary application engine 560 can transmit pose information, connectivity status, user inputs, or the like to the communication engine 525 of the primary application engine 500. The communication engine 525 and communication engine 585 can also transmit and/or receive synchronization signals for synchronizing display between a display of the mobile device 540 and a display of an HMD 550. The examples of communications between the communication engine 525 and communication engine 585 provided herein are non-limiting and provided as examples. In some cases, more, fewer, and/or different information can be communicated over the communications link 530 without departing from the scope of the present disclosure. While an HMD 550 is used as an illustrative example of an XR device herein, the systems and techniques can be used for any type of XR device, such as AR, VR, or MR glasses.

Referring to the secondary application engine 560, the tracking engine 565 can perform tracking (e.g., SLAM, VIO) using information captured by sensors (e.g., image sensor 202, accelerometer 204, gyroscope 206 of FIG. 2, one or more sensors 305, cameras 310 of FIG. 3, or the like). In some cases, tracking engine 565 can determine a pose of the mobile device 540, a pose of the HMD 550, an environment map, or the like. In some aspects, the tracking engine 565 can determine a contour of a display of the mobile device 540. In some cases, the contour of the display of the mobile device 540 can include a boundary. In some cases, the pose of the mobile device 540 and/or the contour, and/or boundary of the display of the mobile device 540 can be output to the AR rendering engine 575 to provide a target for displaying the AR information (e.g., AR effects, AR UI) on a display of the HMD 550.

The AR rendering module 460 can be similar to and perform similar functions to the AR rendering module 460 of FIG. 4. For example, in some implementations, the HMD 550 can include an AR effects rendering engine (e.g., AR effects rendering engine 465 of FIG. 4) and/or an AR UI rendering engine (e.g., AR UI rendering engine 470 of FIG. 4). In some cases, the AR rendering engine 575 can output AR media content to the HMD 550 with different display parameters (e.g., a different resolution, frame rate, aspect ratio, and/or any other display parameters) than the media content output from the rendering engine 515 to the mobile device 540. In some cases, by dividing the rendering functionality between a primary application engine 500 and a secondary application engine 560, the computational resources for providing an AR enhanced application experience can be shared between computational resources of multiple devices such as the mobile device 540 and HMD 550. In addition, providing a separate AR rendering engine 575 in the secondary application engine 560 can simplify development of the primary application engine 500. For example, the rendering engine 515 of the primary application engine 500 may not require maintaining compatibility with a variety of different mobile devices with different display configurations.

In some cases, the HMD 550 may be relatively constrained in terms of battery and processing power, as compared to mobile device 540, to allow the HMD 550 to be wearable. To reduce processing requirements for the HMD 550, images for display by the HMD 550 may be rendered by the mobile device 540 and transmitted to the HMD 550 via communications link 530. In some cases, the HMD may receive multiple images for display to the user concurrently. For example, the rendering engine 515 of the mobile device 540 may render a left eye image, a right eye image, and, in some cases, provide depth information. For instance, the depth information can include information indicating distances of points in a scene (e.g., points corresponding to a surface of an object) from a point of view, such as a camera viewpoint. In some cases, the depth information may be inferred based on differences between the left eye image and the right eye image received, for example, by the HMD 550. In some cases, the depth information may be used to warp (e.g., apply a displacement vector to) portions of the images to help adjust for movement of objects that may move independently of the camera (such as cameras on the HMD 550), between the time the images are rendered by the rendering engine 515 and when the images are received by the HMD 550. The rendered image may be in any known image or video format. In some cases, the images may only include objects to be overlaid on an environment visible through the HMD 550. An encoding engine 520 may encode the rendered images to reduce a size of the images for transmission. The encoded images may be transmitted, via communication engine 525 and communications link 530, to the HMD 550.

The HMD may receive the encoded images via communication engine 585. For example, these received images may then be decoded by decoding engine 580. In some cases, there may be a delay (e.g., display latency) introduced by the rendering, encoding, transmitting, receiving, and decoding process, and during this display latency, a cuser may, for example, move the HMD 550. This movement may not be accounted for by the images as rendered by the rendering engine 515 and any objects in the rendered images may be displayed in a different location than expected due to the movement. To account for the potential motion of the HMD 550, the AR rendering engine 575 may warp the received images based on pose and/or tracking information from the tracking engine 565 describing the movement of the HMD 550. In some cases, the techniques discussed herein may be applicable to other scenarios where there is sufficient lag between when images are rendered and when those images are displayed that noticeable movement may have occurred.

Figure 6A:
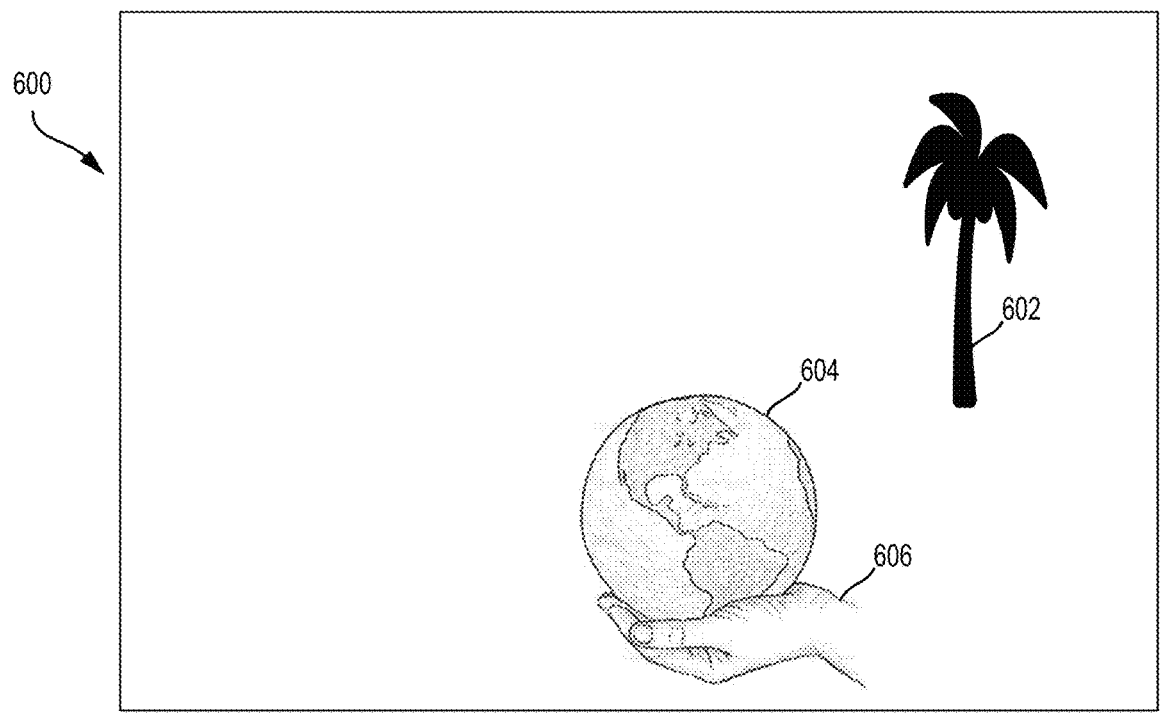
FIGS. 6A and 6B are images illustrating example scenes for a XR system, in accordance with aspects of the present disclosure.
Figure 6B:
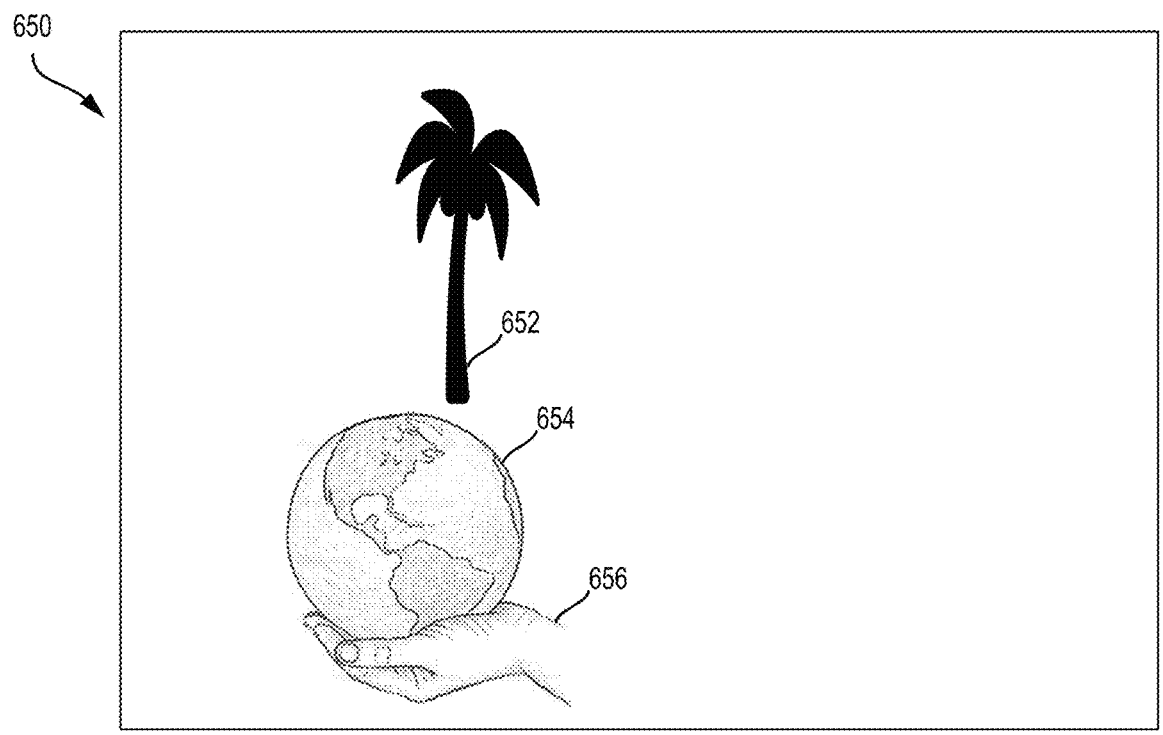

FIGS. 6A and 6B are images illustrating example scenes for a XR system, in accordance with aspects of the present disclosure. FIG. 6A illustrates an image 600 that may be rendered in part by the mobile device. For example, the mobile device may render a first virtual object, such as a tree 602, and overlay the tree 602 in an environment in a first location. The mobile device may also render a second virtual object, such as a globe 604, which is overlaid in the environment on a hand 606 of the user. In some cases, the hand 606 may be physically present within the environment and within a field of view of the image 600. In some cases, the hand may be rendered or overlaid in the images. Once rendered, image 600 may be encoded and transmitted to the HMD 550 for display.

While image 600 is being rendered, encoded, transmitted, received, and decoded, the HMD may be moved (e.g., the user may move) in a rightward direction. As this movement had not occurred when image 600 was rendered, the movement is not accounted for by image 600. In some cases, the HMD may warp image 600 and display a warped image 650 of FIG. 6B. In some cases, image 600 may be warped to image 650 based, at least in part, on pose and/or tracking information indicating how the HMD has been moved. In warped image 650, a tree 652, corresponding to tree 602, has been warped such that the tree 652 is displayed in the first location despite the movement of the HMD.

In some cases, while movement of the HMD may be accounted for, information regarding how the HMD has moved may not account for all of the possible movement in the environment. In some cases, extremities of a user may be visible in the environment and movement of these extremities may not align with how the HMD has been moved. As an example, a user's hand 656 may be visible in the environment, and while the HMD may be moved to the right during the delay latency, the user's hand 656 may have moved to the left during the delay latency. If an object, such as globe 654, were warped based on information indicating how the HMD has been moved, the globe 654 would no longer be properly overlaid in the user's hand 656. That is, a user may move their hand in a different direction than their head (and thus the HMD) and the information describing how the HMD moved may not apply to their hand.

In some cases, a mask layer may be used to allow adjusting rendered images for independent movement of physical objects in a scene (e.g., environment and objects visible in a field of view) and movement of the HMD. FIG. 7 illustrates an example mask layer 700, in accordance with aspects of the present disclosure. In some cases, the mask layer may include a bit/bits corresponding with each pixel of an image. Values of the mask layer may indicate portions of the image which include a virtual object that is associated with a physical object in a field of view of the image that may be moved independently of the HMD. For example, if a virtual object in an image, such as globe 604 of FIG. 6A, is supposed to be projected on/in/around a physical object, such as a hand, that is in a field of view of the image (e.g., in the image) to be displayed on the HMD, then portions of the mask layer corresponding to pixels of the virtual object may be indicated in the mask layer. As this physical object (e.g., the hand) may move independently of the HMD, the virtual object (e.g., globe 604) may also move independently of the HMD.

In mask layer 700, values of 1 may correspond to pixels of the image which form the virtual object (e.g., globe 604) that may move independently of the HMD, and values of 0 may correspond to pixels which do not form a virtual object that may be moved independently of the HMD. In some cases, multiple mask layers may be generated. For example, a mask layer may be generated for each object associated with a physical object in a field of view of an image to be displayed by the HMD which may move independently of the HMD. Thus, if two hands of the user are visible in the image and both hands are associated with virtual objects, then two mask layers may be generated, one for each hand.

In some cases, a mask layer may include an object identifier indicating a virtual object for which the mask layer is referencing. For example, the object identifier may be a plurality of bits, where different bits of the plurality of bits correspond to different virtual objects. For example, a mask layer may include 2 bit values where the first bit corresponds to a first virtual object and the second bit corresponds to a second virtual object. In such an example, bit values of 01 may correspond to pixels which form a first virtual object (e.g., globe 604) that may move along with movements of a left hand independently of the HMD, and bit values of 10 may correspond to pixels which form a second virtual object that may move along with movements of a right hand independently of the HMD. Similarly, values 00 may correspond to pixels which form a virtual object that may be moved along with HMD. As another example, the object identifier may be a unique code (e.g., number) for each object and the mask layer may include this number corresponding to different virtual objects. A bit values included in the mask layer may be based on a number of different virtual objects that may move independently of the HMD. For example, two bits may be used to represent four virtual objects, 3 bits may be used to represent eight objects, and so forth. The mask layer in this way can account for multiple independent movements in the scene (e.g., in a single mask layer).

Figure 8:
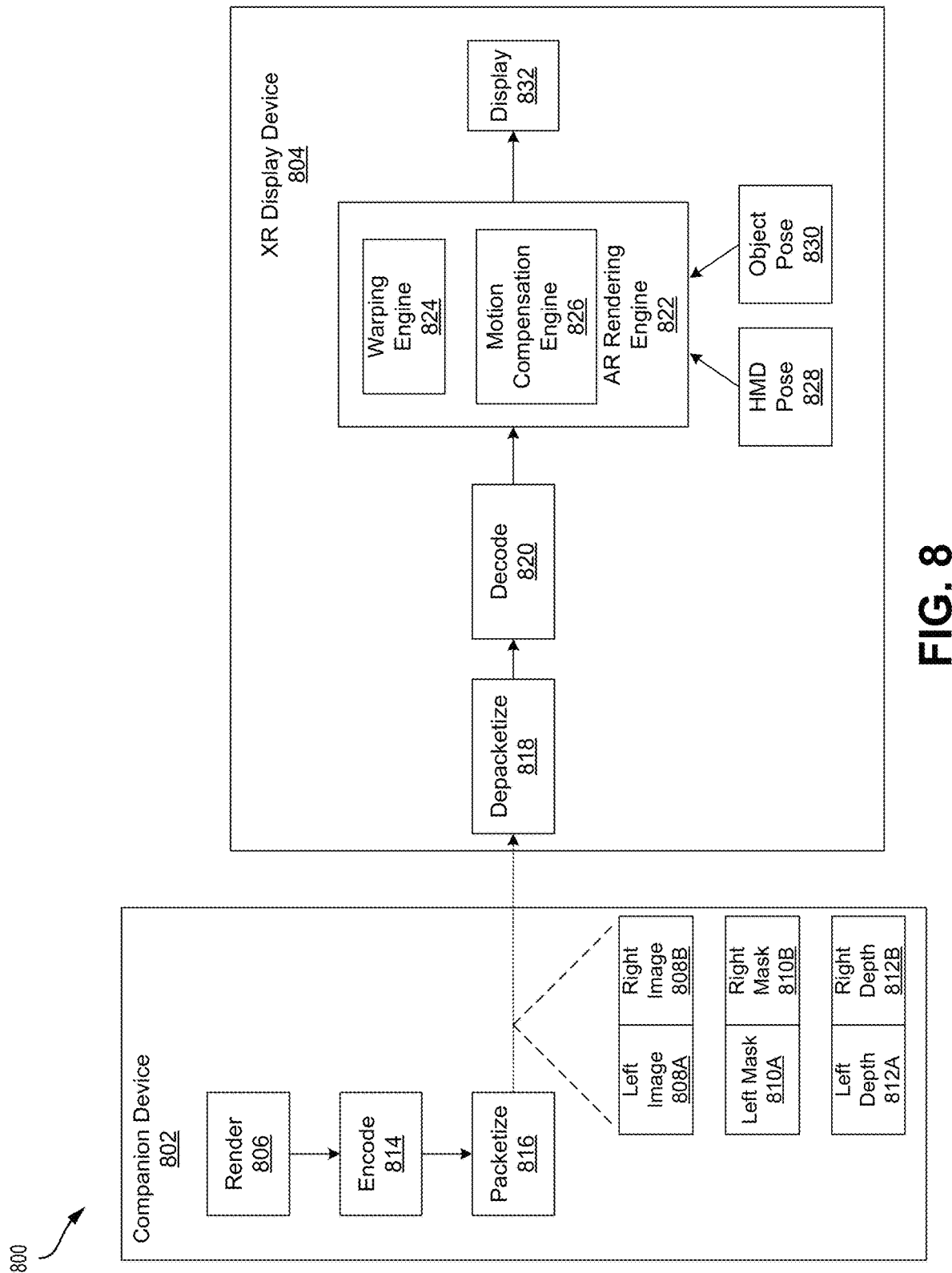
FIG. 8 is a block diagram illustrating an example of a process for low latency and low power independent scene movement in an XR system, in accordance with aspects of the present disclosure.

FIG. 8 is a block diagram 800 illustrating an example process for determining low latency and low power independent scene movement in an XR system based on mask layers(s), in accordance with aspects of the present disclosure. In some cases, the XR system may include a companion device 802 and an XR display device 804. In some cases, the companion device 802 may be any device capable of executing an application engine, such as primary application engine 500 of FIG. 5. Examples of the companion device 802 may include a mobile device, a personal computer, tablet computer, etc. The companion device 802 is coupled to an XR display device 804. The XR display device 804 may be any XR device, such as an HMD 550, capable of displaying images and executing a secondary application engine, such as secondary application engine 560. The companion device 802 may be coupled to the XR display device 804 via a wired or wireless network, such as ethernet, Wi-Fi, and the like.

In some cases, the companion device 802 may be a relatively higher power device as compared to XR display device 804, and the companion device 802 may generate images for display by the XR display device 804. To generate images for display by the XR device, the companion device may render 806 a set of images to be displayed. The images rendered may be based on locations of tracked physical objects. For example, the XR display device 804 may include one or more sensors or SLAM systems (such as SLAM system 300) capable of tracking and determining pose and/or tracking information for the XR display device 804, as well as pose and/or tracking information for extremities of the user, such as hands, fingers, legs, feet, etc. In some cases, the extremities of the user may be determined to be capable of moving independently of the motion of the HMD. In some cases, other physical objects being tracked by the XR system, separate from the user, may also be determined to be capable of moving independently of the motion of the HMD. In some cases, a determination whether a physical object is capable of moving independent of the motion of the HMD may be based on whether pose and/or tracking information is available for the physical object.

If a virtual object is to be rendered and that virtual object is associated with a physical object capable of independent movement, a mask layer associated with the physical object may be generated, for example, as part of rendering 806. For example, virtual objects may be represented as a mesh of vertices in a virtual 3D space and these vertices may be rasterized into pixels of a 2D image for display. If a portion of a virtual object capable of independent movement is rasterized into a pixel, then a corresponding location in a mask layer may be updated to indicate that the corresponding pixel may be independently moved. In some cases, the XR display device may be capable of generating a 3D view by displaying separate left and right images. In such cases, the companion device may render a left image 808A and a right image 808B (collectively images 808). In addition, the companion device may also render a set of left mask layers 810A and a set of left mask layers 810B (collectively mask layers 810) when a virtual object capable of independent movement is to be displayed. In some cases, left depth information 812A and right depth information 812B (collectively depth information 812) may also be generated as a part of rendering 806. After rendering 806, the generated image information (e.g., images, mask layer(s), and depth information) may be encoded 814 and packetized 816 (e.g., split into data packets) for transmission to the XR display device 804.

The XR display device 804 may receive, depacketize 818, and decode 820 the generated image information. In some cases, after decoding 820, the generated image information may be passed to an AR rendering engine 822 for processing. In some cases, the AR rendering engine 822 may include a warping engine 824 and a motion compensation engine 826. In some cases, the AR rendering engine 822 can receive updated HMD pose information 828 and updated object pose information 830. The updated HMD pose information 828 and updated object pose information 830 may include pose information relative to an HMD pose and object pose when the images 808 were rendered.

In some cases, the motion compensation engine 826 may determine an amount to warp the images 808 based on the updated HMD pose information 828 and updated object pose information 830 and the depth information 812 and the warping engine 824 may perform the warping of the images. For example, the motion compensation engine 826 may determine where the object should be moved to in the images 808 given a change in location of the HMD determined based on the HMD pose information 828, a change in location of the object based on the object pose information 830, and how far the object is from the HMD based on the depth information.

In some cases, the XR device, or components thereof such as the XR display device 804, can warp (e.g., asynchronous reprojection) to correct the rotational motion between frames, and use optical flow to correct the translational motion between frames. For example, warping can generally correct rotational motion efficiently and accurately. Accordingly, the XR device can use warping to correct the rotational motion in an image. The XR device can reproject the images with the translational motion but without the rotational motion. For example, the XR device can subtract the rotational motion between images from the estimated motion, and use the resulting translational motion to estimate the warped image. The XR device can use warping to correct the rotational motion in the warped image. In some examples, the XR device can determine a pose of the XR device when the rendered images were rendered and use the pose to extrapolate the warped image. Before determining and/or applying the optical flow for the warped image, the XR device can use the pose information to reproject the rendered image without the rotational motion.

In some cases, the XR device can fix and/or project different types of motion. For example, the XR device can fix and/or project rotational head movement (e.g., three degrees of freedom or "3DOF"). The rotational movement can include rotations around each axis. The XR device can use warping to correct rotational movement by applying rotational transforms to the rendered image. Moreover, the XR device can fix and/or project translational head movement (e.g., six degrees of freedom or "6DOF"). The translational movement can include translations along each axis. The XR device can also fix and/or project object movements in a scene. The object movements can correspond to objects that are in motion in the scene and have changed position between images. In some examples, the motion estimation described herein can cover the rotational movement (e.g., 3DOF), the translational movement (e.g., 6DOF), and the object movements.

In some cases, for image extrapolation, such as to warp certain objects, the XR device can texture map rendered images to a grid of geometric shapes. The XR device can move the positions of the vertices in the grid based, for example, updated object pose information 830 and the depth information 812 for the object. This can shift and manipulate regions of the camera frame corresponding to the object in accordance with their motion in order to move objects into their location indicated by the pose information.

In some cases, the XR device can perform image extrapolation by moving a geometry or by moving UV texture coordinates. For example, the XR device can perform an extrapolation render pass by moving a geometry of a mesh or manipulating UV texture coordinates to change how the source rendered image is mapped to the geometry. In some cases, the XR device can distort a mesh by moving the geometry of the mesh. In some examples, when moving the geometry, the XR device can move each vertex during a vertex shader pass based on the motion vector magnitude and direction at a corresponding point. In some examples, when moving texture coordinates, the XR device can determine the inverse movement and use the inverse to adjust the texture coordinates.

In some cases, the AR rendering engine 822 may include one or more GPUs. In some cases, the AR rendering engine 822 may, via the one or more GPUs, construct a pseudo 3D representation of a scene as shown in images 808 based on images 808 and the depth information 812. In some examples, vertices may be determined for objects in the images 808 based on detected edges in the images 808 and associate those vertices with objects based on the mask layers 810. In some cases, the one or more GPUs may include vertex and fragment shaders. In some cases, the fragment shader may texture sample a portion of the images 808 based on the mask layers 810. These sampled textures may act as a filter to select relevant fragment coordinates corresponding to either the virtual object or HMD movement. These fragment coordinates may be used for computing a motion vector for warping the image. The vertex shader may apply transformations to vertices associated with the objects based on an amount of motion compensation determined for the object (e.g., from the motion compensation engine 826). The vertex shaders may also apply transformations to vertices associated with those objects not associated with independent movement based on an amount of motion compensation determined for the HMD. In some cases, the vertex shader may texture sample mask layers 810. These sampled textures may act as a filter to select a relevant model transformation corresponding to either the virtual object or HMD movement. These transformed vertex coordinates may be used for computing a motion vector for warping the image. In some cases, the one or more GPUs may use a mask layer to merge multiple motion maps generated by other compute engines in AR rendering engine 822 into a single motion map. After the images 808 are warped based on the mask layers 810, the images may be transmitted to display 832 for display.

Figure 9:
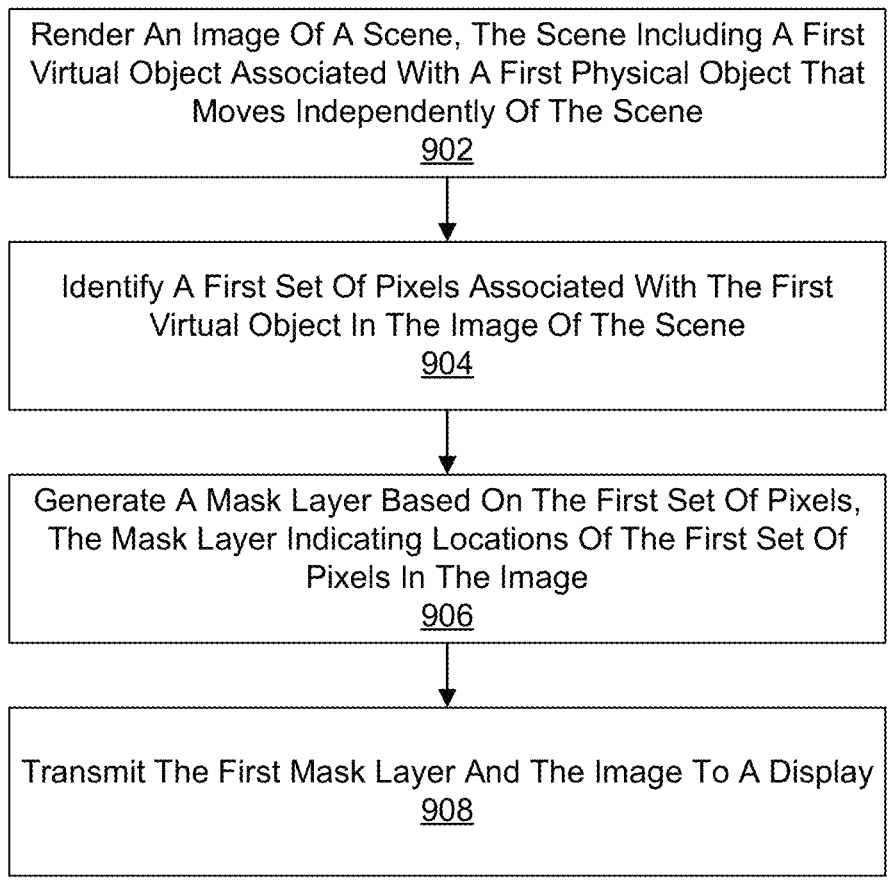
FIG. 9 is a flow diagram illustrating an example of a process for performing image generation, in accordance with some aspects.

FIG. 9 is a flow diagram illustrating a process 900 for image generation, in accordance with aspects of the present disclosure. The process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 900 may be implemented as software components that are executed and run on one or more processors.

At block 902, the computing device (or component thereof) may render an image of a scene, the scene including a first virtual object associated with a first physical object that moves independently of the scene. In some cases, the display is coupled to, but separate from the computing device. The computing device (or component thereof) may determine that the first physical object can move independently of the scene. The computing device (or component thereof) may, to determine that the first physical object can move independently of the scene, receive an indication that the display device has stored pose information associated with the first physical object. The computing device (or component thereof) may determine that the first physical object can move independently of the scene based on the received indication.

At block 904, the computing device (or component thereof) may identify a first set of pixels associated with the first virtual object in the image of the scene.

At block 906, the computing device (or component thereof) may generate a mask layer based on the first set of pixels, the mask layer indicating locations of the first set of pixels in the image. In some cases, the mask layer includes an object identifier corresponding to pixels of the image. The computing device (or component thereof) may, to generate the mask layer, set locations in the mask layer corresponding with the identified first set of pixels with the object identifier associated with the first virtual object. The computing device (or component thereof) may generate depth information for the first virtual object. The computing device (or component thereof) may transmit the depth information along with the mask layer and the image to the display. In some cases, the scene includes a second virtual object associated with a second physical object that moves independently of the scene. The computing device (or component thereof) may render the image of the scene including the second virtual object. The computing device (or component thereof) may identify a second set of pixels associated with the second virtual object in the image of the scene. The computing device (or component thereof) may generate the mask layer based on the first set of pixels and the second set of pixels.

At block 908, the computing device (or component thereof) may transmit the mask layer and the image to a display. In some cases, the computing device may be a mobile phone.

FIG. 10 is a flow diagram illustrating a process 1000 for image generation, in accordance with aspects of the present disclosure. The process 1000 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 1000 may be implemented as software components that are executed and run on one or more processors.

At block 1002, the computing device (or component thereof) may obtain a mask layer and an image associated with the mask layer, wherein the mask layer is associated with a first virtual object. In some cases, the mask layer includes an object identifier corresponding to pixels of the image.

At block 1004, the computing device (or component thereof) may generate updated pose information for the apparatus, wherein the updated pose information indicates movement between a time when the image was generated and a current time.

At block 1006, the computing device (or component thereof) may obtain updated pose information for a first physical object, wherein the first physical object moves independently of the apparatus, and wherein the first physical object is associated with the first virtual object. The computing device (or component thereof) may obtain first pose information for the first physical object. The computing device (or component thereof) may generate second pose information for the apparatus. The computing device (or component thereof) may transmit the first pose information and second pose information to a companion device for rendering images for the apparatus.

At block 1008, the computing device (or component thereof) may determine a first amount to warp the image based on the updated pose information for the apparatus.

At block 1010, the computing device (or component thereof) may determine a second amount to warp a first portion of the image based on the mask layer and the updated pose information for the first physical object.

At block 1012, the computing device (or component thereof) may warp the image, based on the first amount to warp the image, and the first portion of the image, based on the second amount to warp a first virtual object with the first physical object. The computing device (or component thereof) may receive depth information associated with the first virtual object along with the mask layer and image. The computing device (or component thereof) may determine the second amount to warp the first portion of the image further based on the depth information. In some cases, the mask layer is associated with a second virtual object. The computing device (or component thereof) may obtain updated pose information for the second physical object. The computing device (or component thereof) may determine a third amount to warp a second portion of the image based on the mask layer and the updated pose information for the second physical object. The computing device (or component thereof) may warp the second portion of the image based on the third amount.

At block 1014, the computing device (or component thereof) may display a final warped image based on the warping of the image and the warping of the first portion of the image.

Figure 11A:
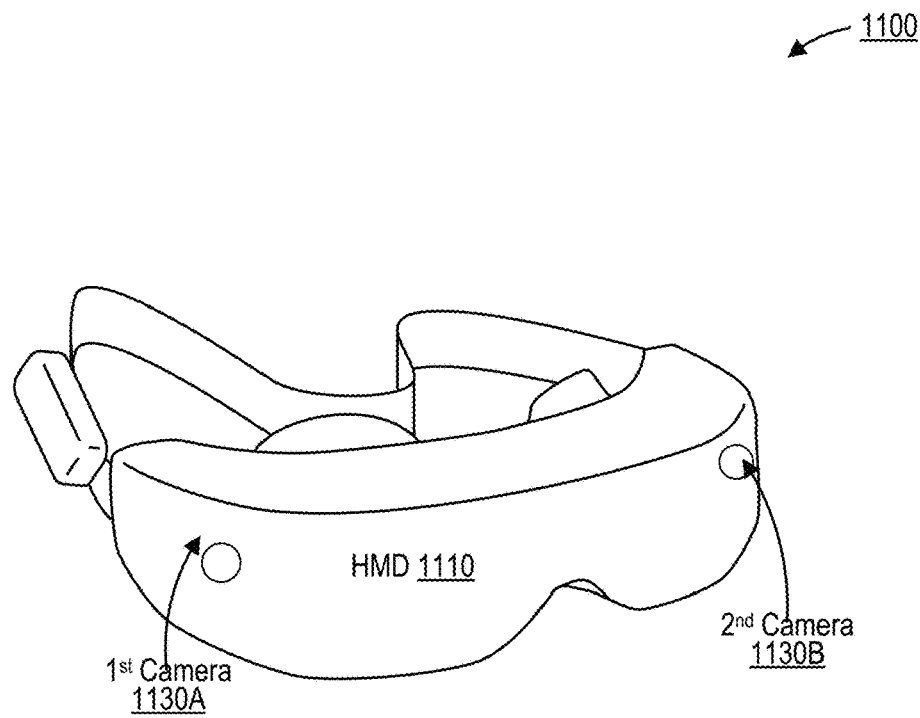
FIG. 11A is a perspective diagram illustrating a head-mounted display (HMD) 1110 that performs feature tracking and/or visual simultaneous localization and mapping (VSLAM), in accordance with some examples.

FIG. 11A is a perspective diagram 1100 illustrating a head-mounted display (HMD) 1110 that performs feature tracking and/or visual simultaneous localization and mapping (VSLAM), in accordance with some examples. The HMD 1110 may be, for example, an augmented reality (AR) headset, a virtual reality (VR) headset, a mixed reality (MR) headset, an extended reality (XR) headset, or some combination thereof. The HMD 1110 may be an example of an XR system 200, a SLAM system 300, or a combination thereof. The HMD 1110 includes a first camera 1130A and a second camera 1130B along a front portion of the HMD 1110. The first camera 1130A and the second camera 1130B may be two of the one or more cameras 310. In some examples, the HMD 1110 may only have a single camera. In some examples, the HMD 1110 may include one or more additional cameras in addition to the first camera 1130A and the second camera 1130B. In some examples, the HMD 1110 may include one or more additional sensors in addition to the first camera 1130A and the second camera 1130B.

Figure 11B:
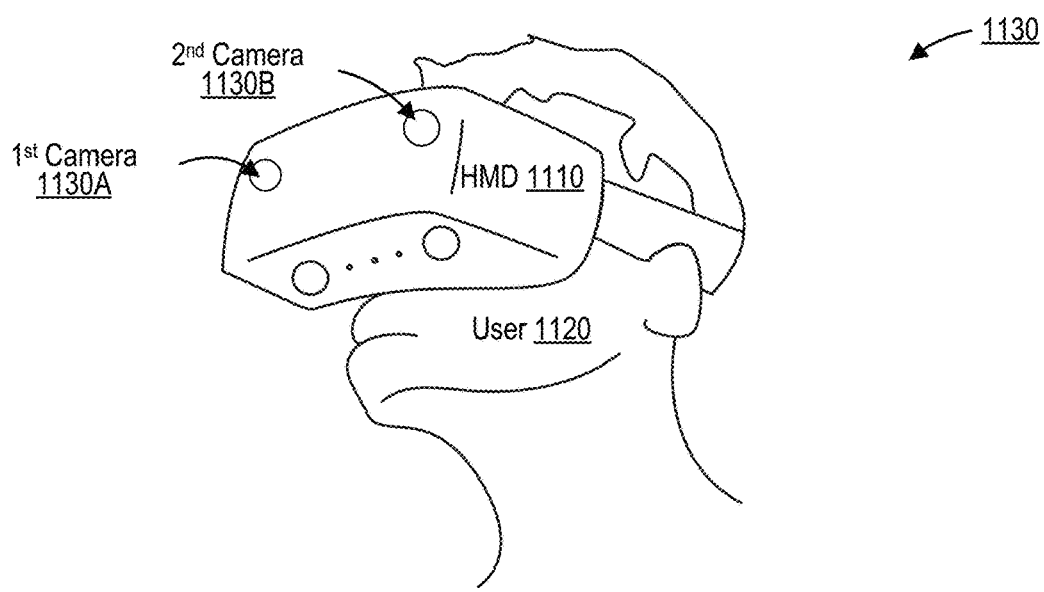
FIG. 11B is a perspective diagram illustrating the head-mounted display (HMD) of FIG. 11A being worn by a user, in accordance with some examples.

FIG. 11B is a perspective diagram 1130 illustrating the head-mounted display (HMD) 1110 of FIG. 11A being worn by a user 1120, in accordance with some examples. The user 1120 wears the HMD 1110 on the user 1120's head over the user 1120's eyes. The HMD 1110 can capture images with the first camera 1130A and the second camera 1130B. In some examples, the HMD 1110 displays one or more display images toward the user 1120's eyes that are based on the images captured by the first camera 1130A and the second camera 1130B. The display images may provide a stereoscopic view of the environment, in some cases with information overlaid and/or with other modifications. For example, the HMD 1110 can display a first display image to the user 1120's right eye, the first display image based on an image captured by the first camera 1130A. The HMD 1110 can display a second display image to the user 1120's left eye, the second display image based on an image captured by the second camera 1130B. For instance, the HMD 1110 may provide overlaid information in the display images overlaid over the images captured by the first camera 1130A and the second camera 1130B.

The HMD 1110 may include no wheels, propellers or other conveyance of its own. Instead, the HMD 1110 relies on the movements of the user 1120 to move the HMD 1110 about the environment. In some cases, for instance where the HMD 1110 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels, propellers, legs, or any other form of conveyance. Even if an environment is virtual, SLAM techniques may still be valuable, as the virtual environment can be unmapped and/or may have been generated by a device other than the HMD 1110, such as a remote server or console associated with a video game or video game platform. In some cases, feature tracking and/or SLAM may be performed in a virtual environment even by a vehicle or other device that has its own physical conveyance system that allows it to physically move about a physical environment. For example, SLAM may be performed in a virtual environment to test whether a SLAM system 300 is working properly without wasting time or energy on movement and without wearing out a physical conveyance system.

Figure 12A:
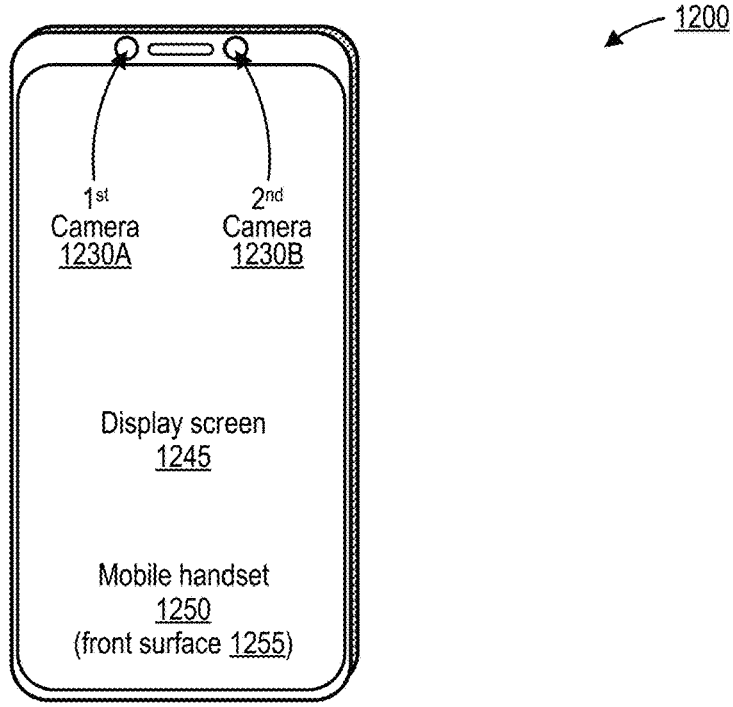
FIG. 12A is a perspective diagram illustrating a front surface of a mobile device that performs feature tracking and/or visual simultaneous localization and mapping (VSLAM) using one or more front-facing cameras, in accordance with some examples.

FIG. 12A is a perspective diagram 1200 illustrating a front surface 1255 of a mobile device 1250 that performs features described here, including, for example, feature tracking and/or visual simultaneous localization and mapping (VSLAM) using one or more front-facing cameras 1230A-B, in accordance with some examples. The mobile device 1250 may be, for example, a cellular telephone, a satellite phone, a portable gaming console, a music player, a health tracking device, a wearable device, a wireless communication device, a laptop, a mobile device, any other type of computing device or computing system 1300 discussed herein, or a combination thereof. The front surface 1255 of the mobile device 1250 includes a display screen 1245. The front surface 1255 of the mobile device 1250 includes a first camera 1230A and a second camera 1230B. The first camera 1230A and the second camera 1230B are illustrated in a bezel around the display screen 1245 on the front surface 1255 of the mobile device 1250. In some examples, the first camera 1230A and the second camera 1230B can be positioned in a notch or cutout that is cut out from the display screen 1245 on the front surface 1255 of the mobile device 1250. In some examples, the first camera 1230A and the second camera 1230B can be under-display cameras that are positioned between the display screen 1245 and the rest of the mobile device 1250, so that light passes through a portion of the display screen 1245 before reaching the first camera 1230A and the second camera 1230B. The first camera 1230A and the second camera 1230B of the perspective diagram 1200 are front-facing cameras. The first camera 1230A and the second camera 1230B face a direction perpendicular to a planar surface of the front surface 1255 of the mobile device 1250. The first camera 1230A and the second camera 1230B may be two of the one or more cameras 310. In some examples, the front surface 1255 of the mobile device 1250 may only have a single camera. In some examples, the mobile device 1250 may include one or more additional cameras in addition to the first camera 1230A and the second camera 1230B. In some examples, the mobile device 1250 may include one or more additional sensors in addition to the first camera 1230A and the second camera 1230B.

Figure 12B:
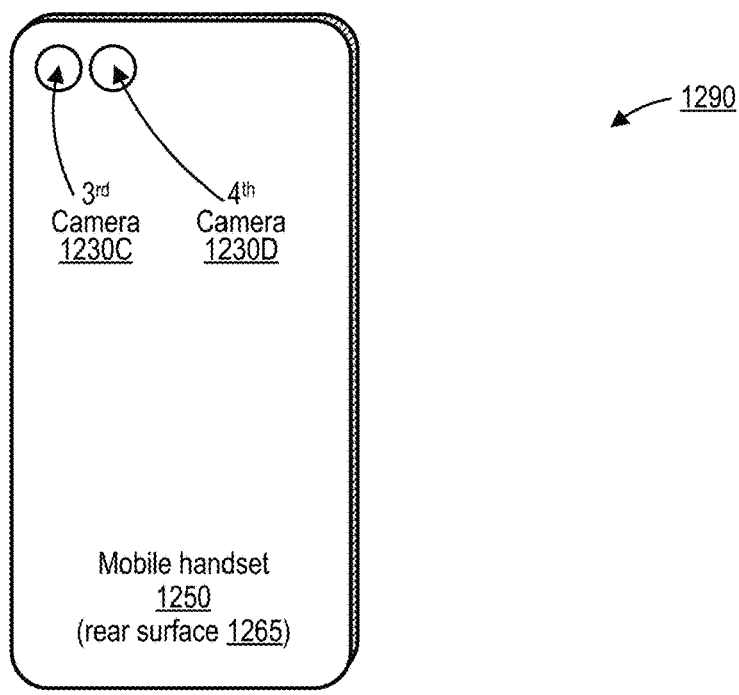
FIG. 12B is a perspective diagram illustrating a rear surface of a mobile device 1250, in accordance with aspects of the present disclosure.

FIG. 12B is a perspective diagram 12120 illustrating a rear surface 1265 of a mobile device 1250. The mobile device 1250 includes a third camera 1230C and a fourth camera 1230D on the rear surface 1265 of the mobile device 1250. The third camera 1230C and the fourth camera 1230D of the perspective diagram 1290 are rear-facing. The third camera 1230C and the fourth camera 1230D face a direction perpendicular to a planar surface of the rear surface 1265 of the mobile device 1250. While the rear surface 1265 of the mobile device 1250 does not have a display screen 1245 as illustrated in the perspective diagram 1290, in some examples, the rear surface 1265 of the mobile device 1250 may have a second display screen. If the rear surface 1265 of the mobile device 1250 has a display screen 1245, any positioning of the third camera 1230C and the fourth camera 1230D relative to the display screen 1245 may be used as discussed with respect to the first camera 1230A and the second camera 1230B at the front surface 1255 of the mobile device 1250. The third camera 1230C and the fourth camera 1230D may be two of the one or more cameras 310. In some examples, the rear surface 1265 of the mobile device 1250 may only have a single camera. In some examples, the mobile device 1250 may include one or more additional cameras in addition to the first camera 1230A, the second camera 1230B, the third camera 1230C, and the fourth camera 1230D. In some examples, the mobile device 1250 may include one or more additional sensors in addition to the first camera 1230A, the second camera 1230B, the third camera 1230C, and the fourth camera 1230D.

Like the HMD 1110, the mobile device 1250 includes no wheels, propellers, or other conveyance of its own. Instead, the mobile device 1250 relies on the movements of a user holding or wearing the mobile device 1250 to move the mobile device 1250 about the environment. In some cases, for instance where the mobile device 1250 is used for AR, VR, MR, or XR, the environment may be entirely or partially virtual. In some cases, the mobile device 1250 may be slotted into ahead-mounted device (HMD) (e.g., into a cradle of the HMD) so that the mobile device 1250 functions as a display of the HMD, with the display screen 1245 of the mobile device 1250 functioning as the display of the HMD. If the environment is at least partially virtual, then movement through the virtual environment may be virtual as well. For instance, movement through the virtual environment can be controlled by one or more joysticks, buttons, video game controllers, mice, keyboards, trackpads, and/or other input devices that are coupled in a wired or wireless fashion to the mobile device 1250.

Figure 13:
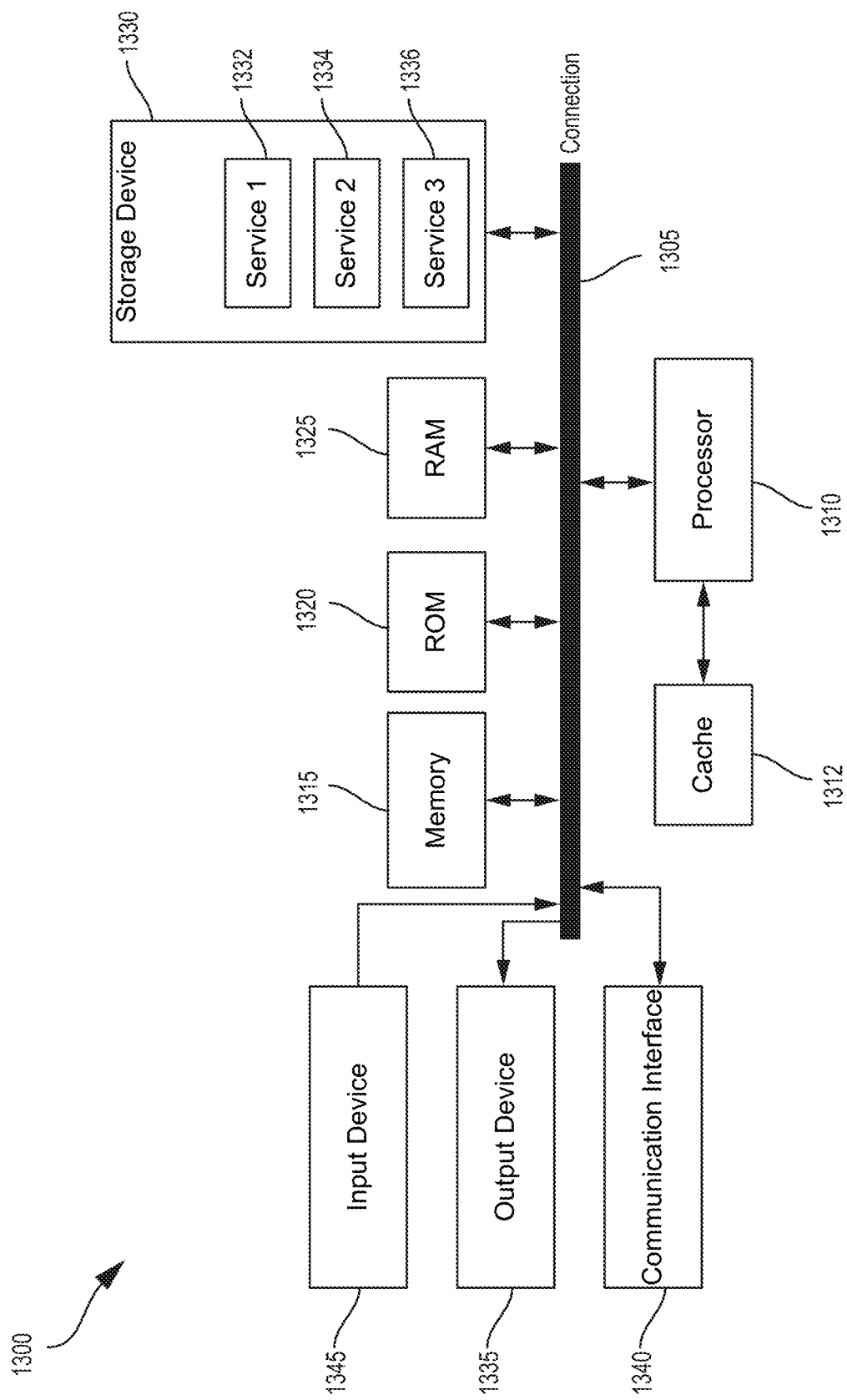
FIG. 13 is a diagram illustrating an example of a system for implementing certain aspects of the present technology.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some examples, computing system 1300 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, camera, accelerometers, gyroscopes, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some examples, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1. An apparatus for image generation, comprising: a memory comprising instructions; and a processor coupled to the memory and configured to: render an image of a scene, the scene including a first virtual object associated with a first physical object that moves independently of the scene; identify a first set of pixels associated with the first virtual object in the image of the scene; generate a mask layer based on the first set of pixels, the mask layer indicating locations of the first set of pixels in the image; and transmit the mask layer and the image to a display.

Aspect 2. The apparatus of aspect 1, wherein the display is coupled to, but separate from the apparatus.

Aspect 3. The apparatus of any of aspects 1-2, wherein the mask layer includes an object identifier corresponding to pixels of the image.

Aspect 4. The apparatus of aspect 3, wherein, to generate the mask layer, the processor is configured to set locations in the mask layer corresponding with the identified first set of pixels with the object identifier associated with the first virtual object.

Aspect 5. The apparatus of any of aspects 1-4, wherein the processor is configured to: generate depth information for the first virtual object; and transmit the depth information along with the mask layer and the image to the display.

Aspect 6. The apparatus of any of aspects 1-5, wherein the processor is configured to determine that the first physical object can move independently of the scene.

Aspect 7. The apparatus of aspect 6, wherein, to determine that the first physical object can move independently of the scene, the processor is configured to: receive an indication that the display has stored pose information associated with the first physical object; and determine that the first physical object can move independently of the scene based on the received indication.

Aspect 8. The apparatus of any of aspects 1-7, wherein the scene includes a second virtual object associated with a second physical object that moves independently of the scene, and wherein the processor is configured to: render the image of the scene including the second virtual object; identify a second set of pixels associated with the second virtual object in the image of the scene; and generate the mask layer based on the first set of pixels and the second set of pixels.

Aspect 9. The apparatus of any of aspects 1-8, wherein the apparatus comprises a mobile phone.

Aspect 10. An apparatus for image generation, comprising: a memory comprising instructions; and a processor coupled to the memory and configured to: obtain a mask layer and an image associated with the mask layer, wherein the mask layer is associated with a first virtual object; generate updated pose information for the apparatus, wherein the updated pose information indicates movement between a time when the image was generated and a current time; obtain updated pose information for a first physical object, wherein the first physical object moves independently of the apparatus, and wherein the first physical object is associated with the first virtual object; determine a first amount to warp the image based on the updated pose information for the apparatus; determine a second amount to warp a first portion of the image based on the mask layer and the updated pose information for the first physical object; warp the image, based on the first amount to warp the image based on the updated pose information, and the first portion of the image, based on the second amount to warp a first virtual object with the first physical object; and display a final warped image based on the warping of the image and the warping of the first portion of the image.

Aspect 11. The apparatus of aspect 10, wherein the mask layer includes an object identifier corresponding to pixels of the image.

Aspect 12. The apparatus of any of aspects 10-11, wherein the processor is configured to: receive depth information associated with the first virtual object along with the mask layer and image; and determine the second amount to warp the first portion of the image further based on the depth information.

Aspect 13. The apparatus of any of aspects 10-12, wherein the processor is configured to: obtain first pose information for the first physical object; generate second pose information for the apparatus; and transmit the first pose information and second pose information to a companion device for rendering images for the apparatus.

Aspect 14. The apparatus of any of aspects 10-13, wherein the mask layer is associated with a second virtual object, and wherein processor is configured to: obtain updated pose information for the second physical object; determine a third amount to warp a second portion of the image based on the mask layer and the updated pose information for the second physical object; and warp the second portion of the image based on the third amount.

Aspect 15. A method for image generation, comprising: rendering an image of a scene, the scene including a first virtual object associated with a first physical object that moves independently of the scene; identifying a first set of pixels associated with the first virtual object in the image of the scene; generating a mask layer based on the first set of pixels, the mask layer indicating locations of the first set of pixels in the image; and transmitting the mask layer and the image to a display.

Aspect 16. The method of aspect 15, wherein the display is coupled to, but separate from a companion device.

Aspect 17. The method of any of aspects 15-16, wherein the mask layer includes an object identifier corresponding to pixels of the image.

Aspect 18. The method of aspect 17, wherein generating the mask layer comprises setting locations in the mask layer corresponding with the identified first set of pixels with the object identifier associated with the first virtual object.

Aspect 19. The method of any of aspects 15-18, further comprising: generating depth information for the first virtual object; and transmitting the depth information along with the mask layer and the image to the display.

Aspect 20. The method of any of aspects 15-19, further comprising determining that the first physical object can move independently of the scene.

Aspect 21. The method of aspect 20, wherein determining that the first physical object can move independently of the scene comprises: receiving an indication that the display has stored pose information associated with the first physical object; and determining that the first physical object can move independently of the scene based on the received indication.

Aspect 22. The method of any of aspects 15-21, wherein the scene includes a second virtual object associated with a second physical object that moves independently of the scene, and further comprising: rendering the image of the scene including the second virtual object; identifying a second set of pixels associated with the second virtual object in the image of the scene; and generate the mask layer based on the first set of pixels and the second set of pixels.

Aspect 23. A method for image generation, comprising: obtaining a mask layer and an image associated with the mask layer, wherein the mask layer is associated with a first virtual object; generating updated pose information for an apparatus, wherein the updated pose information indicates movement between a time when the image was generated and a current time; obtaining updated pose information for a first physical object, wherein the first physical object moves independently of the apparatus, and wherein the first physical object is associated with the first virtual object; determining a first amount to warp the image based on the updated pose information for the apparatus; determining a second amount to warp a first portion of the image based on the mask layer and the updated pose information for the first physical object; warping the image, based on the first amount to warp the image based on the updated pose information, and the first portion of the image, based on the second amount to warp a first virtual object with the first physical object; and displaying a final warped image based on the warping of the image and the warping of the first portion of the image.

Aspect 24. The method of aspect 23, wherein the mask layer includes an object identifier corresponding to pixels of the image.

Aspect 25. The method of any of aspects 23-24, further comprising: receiving depth information associated with the first virtual object along with the mask layer and image; and determining the second amount to warp the first portion of the image further based on the depth information.

Aspect 26. The method of any of aspects 23-25, further comprising: obtaining first pose information for the first physical object; generating second pose information for the apparatus; and transmitting the first pose information and second pose information to a companion device for rendering images.

Aspect 27. The method of any of aspects 23-26, wherein the mask layer is associated with a second virtual object, and further comprising: obtaining updated pose information for the second physical object; determining a third amount to warp a second portion of the image based on the mask layer and the updated pose information for the second physical object; and warping the second portion of the image based on the third amount.

Aspect 28. A non-transitory computer-readable medium having stored thereon instructions that, when executed by at least one processor, cause the at least one processor to: render an image of a scene, the scene including a first virtual object associated with a first physical object that moves independently of the scene; identify a first set of pixels associated with the first virtual object in the image of the scene; generate a mask layer based on the first set of pixels, the mask layer indicating locations of the first set of pixels in the image; and transmit the mask layer and the image to a display.

Aspect 29. A non-transitory computer-readable medium having stored thereon instructions that, when executed by at least one processor, cause the at least one processor to: obtain a mask layer and an image associated with the mask layer, wherein the mask layer is associated with a first virtual object; generate updated pose information for an apparatus, wherein the updated pose information indicates movement between a time when the image was generated and a current time; obtain updated pose information for a first physical object, wherein the first physical object moves independently of the apparatus, and wherein the first physical object is associated with the first virtual object; determine a first amount to warp the image based on the updated pose information for the apparatus; determine a second amount to warp a first portion of the image based on the mask layer and the updated pose information for the first physical object; warp the image, based on the first amount to warp the image based on the updated pose information, and the first portion of the image, based on the second amount to warp a first virtual object with the first physical object; and display a final warped image based on the warping of the image and the warping of the first portion of the image.

Aspect 32: The apparatus of any of Aspects 1 to 15, wherein the apparatus is a mobile device.

Aspect 33. A non-transitory computer-readable medium having stored thereon instructions that, when executed by at least one processor, cause the at least one processor to one or more of operations according to any of Aspects 16 to 30.

Aspect 34: An apparatus for image generation, comprising means for performing one or more of operations according to any of Aspects 16 to 30.

What is claimed is:

1. An apparatus for image generation, comprising:
a memory comprising instructions; and
a processor coupled to the memory and configured to:
render an image of a scene, the scene including a first virtual object associated with a first physical object that moves independently of the scene;
identify a first set of pixels associated with the first virtual object in the image of the scene;
generate a mask layer based on the first set of pixels, the mask layer indicating locations of the first set of pixels in the image; and
transmit the mask layer and the image to a display.

2. The apparatus of claim 1, wherein the display is coupled to, but separate from the apparatus.

3. The apparatus of claim 1, wherein the mask layer includes an object identifier corresponding to pixels of the image.

4. The apparatus of claim 3, wherein, to generate the mask layer, the processor is configured to set locations in the mask layer corresponding with the identified first set of pixels with the object identifier associated with the first virtual object.

5. The apparatus of claim 1, wherein the processor is configured to:
generate depth information for the first virtual object; and
transmit the depth information along with the mask layer and the image to the display.

6. The apparatus of claim 1, wherein the processor is configured to determine that the first physical object can move independently of the scene.

7. The apparatus of claim 6, wherein, to determine that the first physical object can move independently of the scene, the processor is configured to:
receive an indication that the display has stored pose information associated with the first physical object; and
determine that the first physical object can move independently of the scene based on the received indication.

8. The apparatus of claim 1, wherein the scene includes a second virtual object associated with a second physical object that moves independently of the scene, and wherein the processor is configured to:
render the image of the scene including the second virtual object; identify a second set of pixels associated with the second virtual object in the image of the scene; and
generate the mask layer based on the first set of pixels and the second set of pixels.

9. The apparatus of claim 1, wherein the apparatus comprises a mobile phone.

10. An apparatus for displaying images, comprising:
a memory comprising instructions; and
a processor coupled to the memory and configured to:
obtain a mask layer and an image associated with the mask layer, wherein the mask layer is associated with a first virtual object;
generate updated pose information for the apparatus, wherein the updated pose information indicates movement between a time when the image was generated and a current time;
obtain updated pose information for a first physical object, wherein the first physical object moves independently of the apparatus, and wherein the first physical object is associated with the first virtual object;
determine a first amount to warp the image based on the updated pose information for the apparatus;
determine a second amount to warp a first portion of the image based on the mask layer and the updated pose information for the first physical object;
warp the image, based on the first amount to warp the image, and the first portion of the image, based on the second amount to warp a first virtual object with the first physical object; and
display a final warped image based on the warping of the image and the warping of the first portion of the image.

11. The apparatus of claim 10, wherein the mask layer includes an object identifier corresponding to pixels of the image.

12. The apparatus of claim 10, wherein the processor is configured to:
receive depth information associated with the first virtual object along with the mask layer and image; and
determine the second amount to warp the first portion of the image further based on the depth information.

13. The apparatus of claim 10, wherein the processor is configured to:
obtain first pose information for the first physical object;
generate second pose information for the apparatus; and
transmit the first pose information and second pose information to a companion device for rendering images for the apparatus.

14. The apparatus of claim 10, wherein the mask layer is associated with a second virtual object associated with a second physical object, and wherein processor is configured to:
obtain updated pose information for the second physical object;
determine a third amount to warp a second portion of the image based on the mask layer and the updated pose information for the second physical object; and
warp the second portion of the image based on the third amount.

15. A method for image generation, comprising:
rendering an image of a scene, the scene including a first virtual object associated with a first physical object that moves independently of the scene;
identifying a first set of pixels associated with the first virtual object in the image of the scene;
generating a mask layer based on the first set of pixels, the mask layer indicating locations of the first set of pixels in the image; and
transmitting the mask layer and the image to a display.

16. The method of claim 15, wherein the display is coupled to, but separate from a companion device.

17. The method of claim 15, wherein the mask layer includes an object identifier corresponding to pixels of the image.

18. The method of claim 17, wherein generating the mask layer comprises setting locations in the mask layer corresponding with the identified first set of pixels with the object identifier associated with the first virtual object.

19. The method of claim 15, further comprising:
generating depth information for the first virtual object; and
transmitting the depth information along with the mask layer and the image to the display.

20. The method of claim 15, further comprising determining that the first physical object can move independently of the scene.

21. The method of claim 20, wherein determining that the first physical object can move independently of the scene comprises:
receiving an indication that the display has stored pose information associated with the first physical object; and
determining that the first physical object can move independently of the scene based on the received indication.

22. The method of claim 15, wherein the scene includes a second virtual object associated with a second physical object that moves independently of the scene, and further comprising:
rendering the image of the scene including the second virtual object;
identifying a second set of pixels associated with the second virtual object in the image of the scene; and
generate the mask layer based on the first set of pixels and the second set of pixels.

23. A method for displaying images, comprising:
obtaining a mask layer and an image associated with the mask layer, wherein the mask layer is associated with a first virtual object;
generating updated pose information for an apparatus, wherein the updated pose information indicates movement between a time when the image was generated and a current time;

obtaining updated pose information for a first physical object, wherein the first physical object moves independently of the apparatus, and wherein the first physical object is associated with the first virtual object;

determining a first amount to warp the image based on the updated pose information for the apparatus;

determining a second amount to warp a first portion of the image based on the mask layer and the updated pose information for the first physical object;

warping the image, based on the first amount to warp the image, and the first portion of the image, based on the second amount to warp a first virtual object with the first physical object; and displaying a final warped image based on the warping of the image and the warping of the first portion of the image.

24. The method of claim 23, wherein the mask layer includes an object identifier corresponding to pixels of the image.

25. The method of claim 23, further comprising:
receiving depth information associated with the first virtual object along with the mask layer and image; and
determining the second amount to warp the first portion of the image further based on the depth information.

26. The method of claim 23, further comprising:
obtaining first pose information for the first physical object;
generating second pose information for the apparatus; and
transmitting the first pose information and second pose information to a companion device for rendering images.

27. The method of claim 23, wherein the mask layer is associated with a second physical object, and further comprising:
obtaining updated pose information for the second physical object;
determining a third amount to warp a second portion of the image based on the mask layer and the updated pose information for the second physical object; and
warping the second portion of the image based on the third amount.

28. A non-transitory computer-readable medium having stored thereon instructions that, when executed by at least one processor, cause the at least one processor to:
render an image of a scene, the scene including a first virtual object associated with a first physical object that moves independently of the scene;
identify a first set of pixels associated with the first virtual object in the image of the scene;
generate a mask layer based on the first set of pixels, the mask layer indicating locations of the first set of pixels in the image; and
transmit the mask layer and the image to a display.

29. A non-transitory computer-readable medium having stored thereon instructions that, when executed by at least one processor, cause the at least one processor to:
obtain, by a display device, a mask layer and an image associated with the mask layer, wherein the mask layer is associated with a first virtual object;
generate updated pose information for an apparatus, wherein the updated pose information indicates movement between a time when the image was generated and a current time;
obtain updated pose information for a first physical object, wherein the first physical object moves independently of the apparatus, and wherein the first physical object is associated with the first virtual object;
determine a first amount to warp the image based on the updated pose information for the apparatus;
determine a second amount to warp a first portion of the image based on the mask layer and the updated pose information for the first physical object;
warp the image, based on the first amount to warp the image based on the updated pose information, and the first portion of the image, based on the second amount to warp a first virtual object with the first physical object; and
display a final warped image based on the warping of the image and the warping of the first portion of the image.

* * * * *